(12) United States Patent
Takata et al.

(10) Patent No.: US 7,151,152 B2
(45) Date of Patent: Dec. 19, 2006

(54) CROSSLINKED BODY AND METHOD OF PRODUCING THE SAME AND METHOD OF RECYCLING THE SAME

(75) Inventors: Toshikazu Takata, Meguro-ku (JP); Yoshio Furusho, Sakai (JP); Tomoya Oku, Sakai (JP); Daisuke Natsui, Sakai (JP); Shinichi Toyosawa, Kodaira (JP); Takeshi Oba, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 147 days.

(21) Appl. No.: 10/790,121

(22) Filed: Mar. 2, 2004

(65) Prior Publication Data

US 2005/0049383 A1  Mar. 3, 2005

(30) Foreign Application Priority Data

Aug. 28, 2003  (JP) .............................. 2003-209380

(51) Int. Cl.
*C08G 18/48* (2006.01)
(52) U.S. Cl. ..................... 528/73; 528/71; 525/410; 525/452
(58) Field of Classification Search ................. 528/71, 528/73; 525/452, 410
See application file for complete search history.

(56) References Cited

U.S. PATENT DOCUMENTS 5,302,729 A * 4/1994 Gibson et al. .............. 549/349
6,100,329 A * 8/2000 Gibson et al. ................ 525/55
6,828,378 B1 * 12/2004 Okumura et al. ............. 525/55

OTHER PUBLICATIONS

Gong et al; Self-Threading-Based Approach for Branched and/or Cross-linked Poly(methacrylate rotaxane)s; J. Am. Chem. Coc 1997, 119, 5862-5866.*

* cited by examiner

*Primary Examiner*—Rachel Gorr
(74) *Attorney, Agent, or Firm*—Sughrue Mion, PLLC

(57) ABSTRACT

This invention relates to a novel crosslinked body obtained by crosslinking plural polymers and having higher characteristics and being easily decrosslinked, and particularly to a crosslinked body obtained by crosslinking plural polymers through mechanical bonding with a rotaxane structure consisting of a shaft and a ring(s). In the crosslinked body, the polymer may correspond to the ring in the rotaxane structure or the shaft in the rotaxane structure.

11 Claims, 10 Drawing Sheets

FIG. 4
(A)
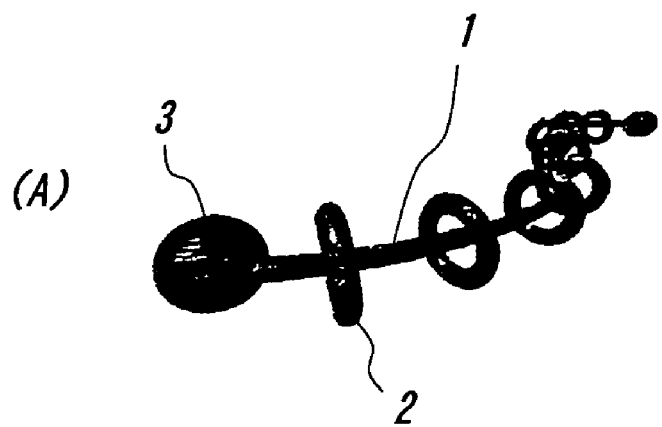
(B)
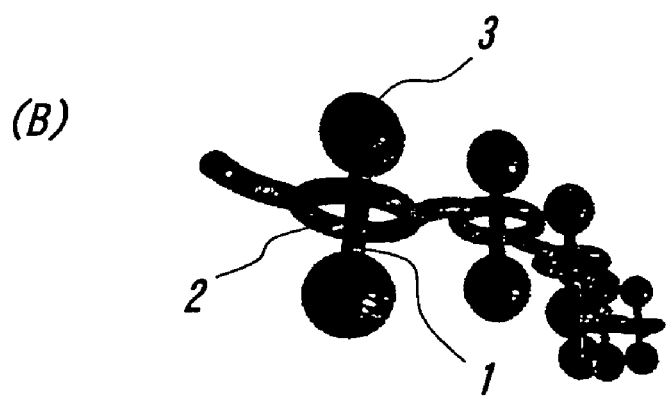
(C)
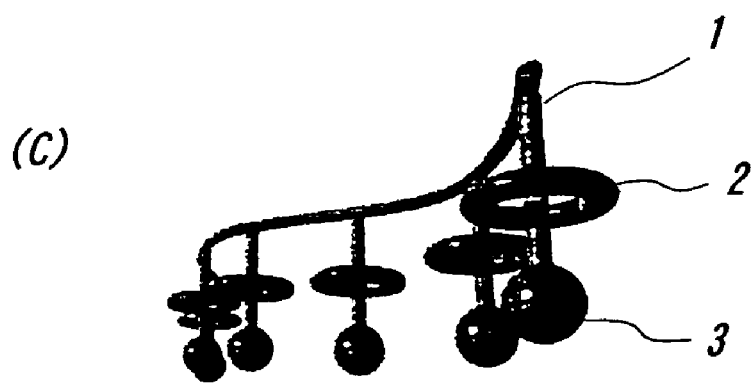

CROSSLINKED BODY AND METHOD OF PRODUCING THE SAME AND METHOD OF RECYCLING THE SAME

TECHNICAL FIELD

This invention relates to a crosslinked body and a method of producing the same as well as a method of recycling the crosslinked body, and more particularly to a crosslinked body obtained by crosslinking through mechanical bonding with a rotaxane structure.

BACKGROUND ART

There is known a compound having a structure that a shaft 1 passes through a ring 2 and end caps 3 are bonded to both ends of the shaft 1 so as to prevent the escaping of the ring 2 as shown in FIG. 1. This compound is called as a rotaxane. Here, it is expressed that the shaft 1 and the ring 2 are connected through mechanical bonding. Since the ring 2 can freely conduct the rotation or translation motion on the shaft 1, it is studied to apply the compound to a molecular switch or the like, for example, by controlling the position of the ring 2 through external stimulation.

As a synthesis of the rotaxane is known a slip method wherein rotaxane bond is produced by thermal pushing with a complementarity of size between the shaft and the ring. Also, there is known a method wherein a pseudorotaxane 4 is produced by a host-guest interaction between the shaft 1 and the ring 2 and thereafter the end caps 3 are bonded to both ends of the shaft 1 as shown in FIG. 2. In the latter method, the yield of the rotaxane is controlled by a complexing ratio of the shaft 1 and the ring 2 in the pseudorotaxane 4 and a kinetically process in the bonding reaction of the pseudorotaxane 4 and the end cap 3.

On the contrary, the inventors have developed a synthesis method of the rotaxane based on kinetic control utilizing an equilibrium reaction being a thiol-disulfide exchange reaction. In this synthesis method, a bifunctional ammonium salt having a disulfide bond is used as the shaft 1 and thiols are added thereto, whereby the disulfide bond is reversibly cleaved through the exchange reaction with the thiols as shown in FIG. 3. In the cleavage of the shaft 1, the ring 2 such as crown ether or the like forms a complex with the ammonium salt to produce [2]rotaxane 5 or [3]rotaxane 6. In the above synthesis method, since all reaction process is the equilibrium reaction, the production of the rotaxane is kinetically controlled and hence the product yield is dependent upon the relative stability, so that [2]rotaxane or [3]rotaxane can be selectively synthesized in a high yield.

On the other hand, there are studied high polymers having plural rotaxane structures in their molecules as shown in FIG. 4 or so-called polyrotaxanes and also the application to new materials or functional materials are studied. In FIG. 4, (A) is a polyrotaxane having a structure that the shaft 1 is a main chain polymer having end caps 3 at its both ends and plural rings 2 pass through the shaft 1, and (B) is a polyrotaxane having a structure that the shaft 1 is a chain molecule having end caps 3 and the ring 2 is a polymer obtained by connecting a plurality of rings 2 through covalent bonding and the shafts 1 are passed through the respective rings 2, and (C) is a polyrotaxane having a structure that a plurality of shafts 1 each having an end cap 3 in its one end are bonded to a main chain polymer and each of the shafts 1 passes through the ring 2. With respect to crosslinked bodies by crosslinking polymers with the rotaxane structure, however, there are not yet conducted sufficient examinations.

Now, there are known a polyurethane consisting of a polyfunctional polyol and diisocyanate and a polyurethane consisting of a bivalent polyol, diisocyanate and diamine. The former is excellent in characteristics owing to the crosslinking through chemical bond, but is difficult in the decrosslinking and hence is difficult in the recycle, while the latter is easy in the decrosslinking owing to the crosslinking through hydrogen bond but is poor in the characteristics. That is, the conventional crosslinked bodies do not simultaneously possess the excellent characteristics and the easiness of the decrosslinking (see Sinzou Yamashita, Kouei Komatsu et al. *Elastomer*, Kyouritsu Shuppan, Feb. 20, 1989, pp. 61–77).

DISCLOSURE OF THE INVENTION

It is, therefore, an object of the invention to provide a novel crosslinked body obtained by crosslinking polymers with the rotaxane structure, and being excellent in the characteristics and easy in the decrosslinking. It is another object of the invention to provide a method of producing such a crosslinked body and a method of recycling the crosslinked body.

In order to achieve the above objects, the inventors have newly synthesized a crosslinked body by crosslinking polymers through mechanical bonding with a rotaxane structure and found that this crosslinked body has various excellent characteristics, and as a result, the invention has been accomplished.

That is, the crosslinked body of the invention is characterized by crosslinking plural polymers through mechanical bonding with a rotaxane structure consisting of a shaft and a ring(s).

In a preferable embodiment of the crosslinked body of the invention, the polymer has a plurality of large cyclic structures corresponding to the ring of the rotaxane structure. In this case, the polymer is preferably a polycrown ether, further preferably a polycrown ether having a crown ether unit represented by the following formula (I):

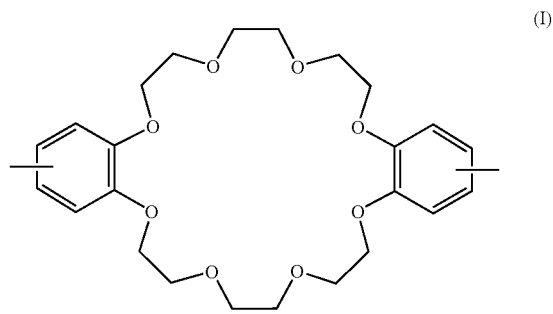

and more preferably a polycrown ether containing the above crown ether unit and a urethane bond.

As the crosslinked body of the invention is preferable a crosslinked body formed by mechanical bonding with a bifunctional ammonium salt having a disulfide bond as the polycrown ether. As the bifunctional ammonium salt having the disulfide bond is mentioned a compound represented by the following formula (II):

(wherein $R^1$ is a bulky group larger than a hole size of the crown ether unit in the polycrown ether, $R^2$ is a bivalent hydrocarbon residue, which may include a hetero atom, and $X^-$ is a monovalent anion).

As the crosslinked body of the invention is also preferable a crosslinked body formed by mechanical bonding with a bifunctional ammonium salt having two urethane bonds as the polycrown ether. As the bifunctional ammonium salt having two urethane bonds is mentioned a compound represented by the following formula (III):

$$(R^1-N^+H_2-R^3-OCONH-R^4-NHCOO-R^3-N^+H_2-R^1)\cdot 2X^- \quad (III)$$

(wherein $R^1$ is a bulky group larger than a hole size of the crown ether unit in the polycrown ether, $R^3$ and $R^4$ are independently a bivalent hydrocarbon residue, which may include a hetero atom, and $X^-$ is a monovalent anion).

In the other preferable embodiment of the crosslinked body of the invention, the polymer corresponds to the shaft of the rotaxane structure. As the polymer is preferable a polyurethane. As the crosslinked body of the invention is also preferable a crosslinked body formed by mechanical bonding with a biscrown ether as the polyurethane.

The method of producing the crosslinked body of the invention is characterized by crosslinking a polymer having a plurality of large cyclic structures and a bifunctional ammonium salt having a disulfide bond in the presence of thiols through mechanical bonding with a rotaxane structure in this case, the polymer having a plurality of large cyclic structures is preferably a polycrown ether, further preferably a polycrown ether having a crown ether unit represented by the following formula (I):

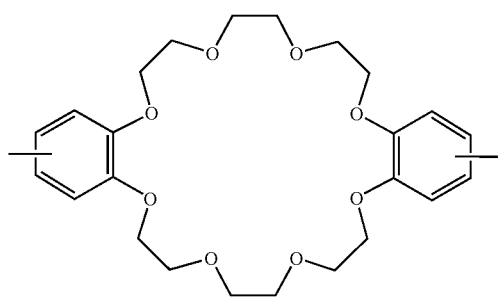

(I)

and more preferably a polycrown ether containing the above crown ether unit and a urethane bond. Also, as the bifunctional ammonium salt having the disulfide bond is mentioned a compound represented by the following formula (II):

$$(R^1-N^+H_2-R^2-S-S-R^2-N^+H_2-R^1)\cdot 2X^- \quad (II)$$

(wherein $R^1$, $R^2$ and $X^-$ are the same meanings as mentioned above).

Another method of producing the crosslinked body of the invention is characterized by polymerizing [3]rotaxane consisting of one shaft and two polymerizable rings at portions of the rings. As a molecule constituting the polymerizable ring is preferable a crown ether, and as a molecule constituting the shaft is preferably a bifunctional ammonium salt having two urethane bonds, further preferably a compound represented by the following formula (III):

$$(R^1-N^+H_2-R^3-OCONH-R^4-NHCOO-R^3-N^+H_2-R^1)\cdot 2X^- \quad (III)$$

(wherein $R^1$, $R^3$, $R^4$ and $X^-$ are the same meanings as mentioned above).

The other method of producing the crosslinked body of the invention is characterized by polymerizing a pseudorotaxane formed by inserting a polymerizable chain molecule into each ring of a compound having two large cyclic structures at a portion of the chain molecule. In this case, biscrown ether is preferable as the compound having two large cyclic structures.

The still further method of producing the crosslinked body of the invention is characterized by crosslinking a polymer having a large cyclic structure and a chain molecule corresponding to a shaft under heating.

Further, the method of recycling the crosslinked body of the invention is characterized by decrosslinking the crosslinked body under heating.

The other method of recycling the crosslinked body of the invention is characterized by decrosslinking the crosslinked body having a disulfide bond in the presence of thiols. In this case, a compound represented by the following formula (IV):

$$(R^1-N^+H_2-R^2-SH)\cdot X^- \quad (IV)$$

(wherein $R^1$, $R^2$ and $X^-$ are the same meanings as mentioned above) is preferable as the thiol.

BRIEF DESCRIPTION OF THE DRAWINGS

FIG. 4 is a conceptual view of a polyrotaxane.

BEST MODE FOR CARRYING OUT THE INVENTION

Figure 1:
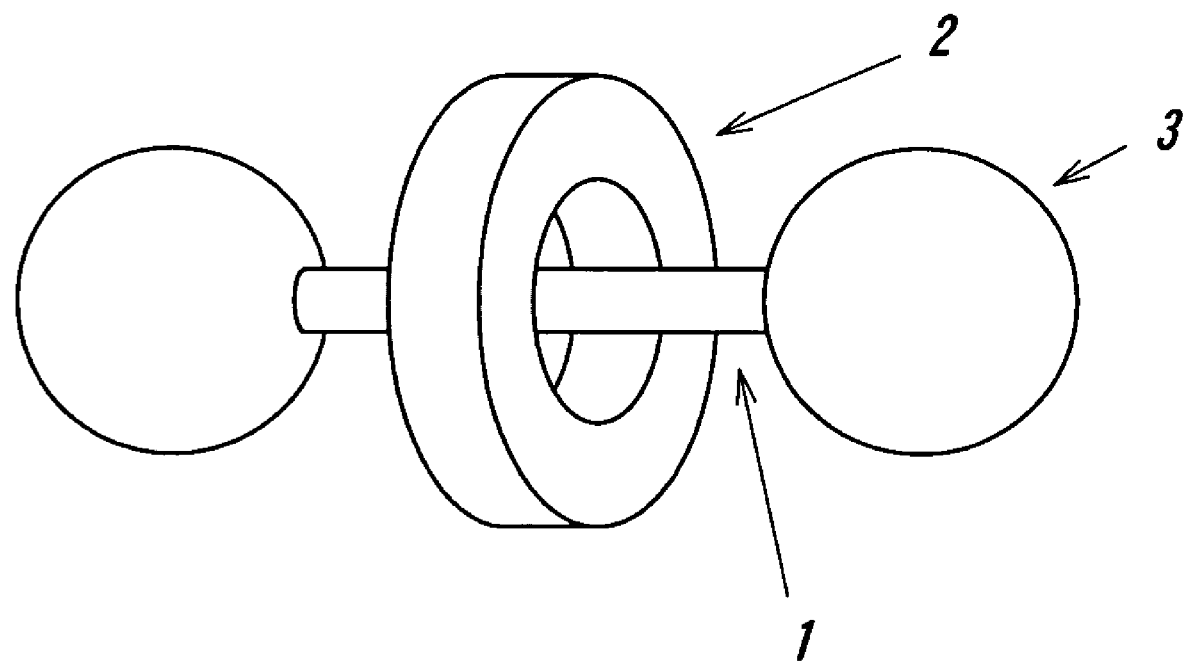
FIG. 1 is a conceptual view of a rotaxane.
Figure 2:
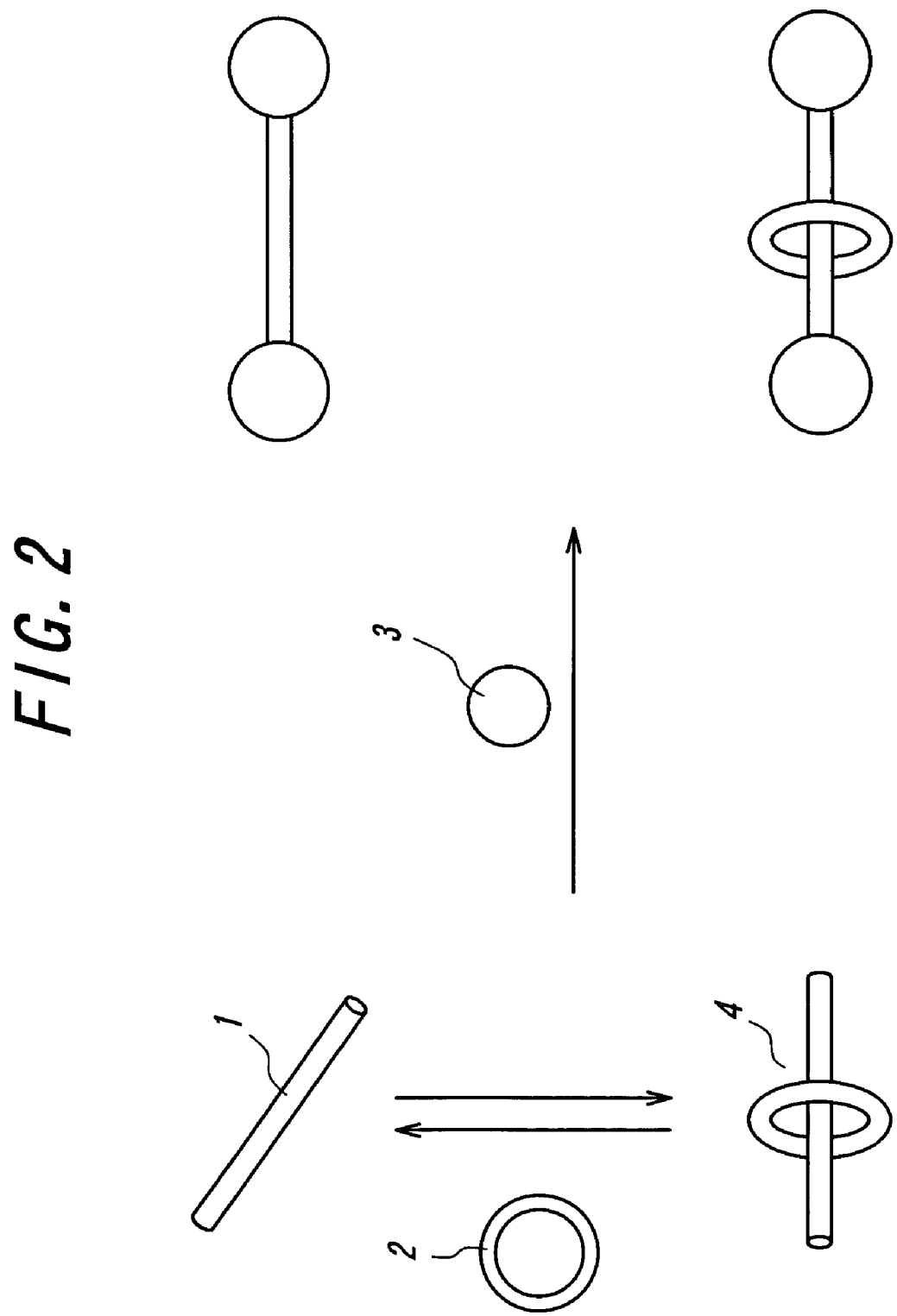
FIG. 2 is a conceptual view of a rotaxane synthesis by an end cap method.
Figure 3:
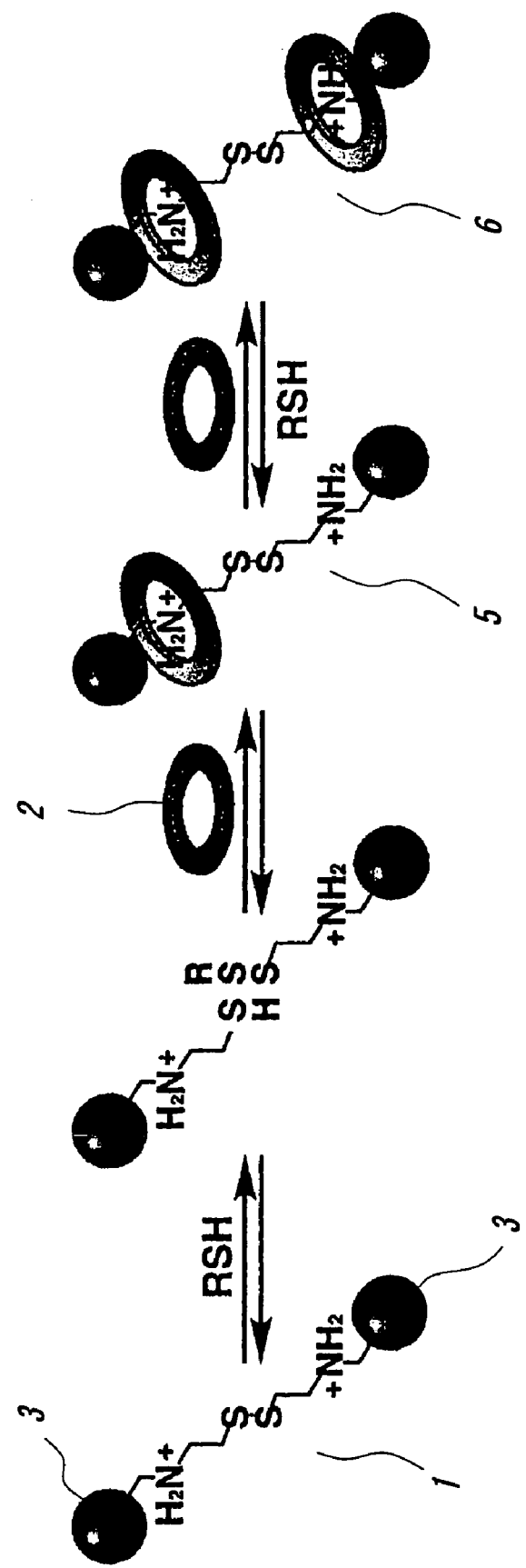
FIG. 3 is a conceptual view of a rotaxane synthesis utilizing a thiol-disulfide exchange reaction.

The invention will be described in detail below. In the crosslinked body of the invention, plural polymers are crosslinked through mechanical bonding with a rotaxane structure consisting of a shaft(s) and a ring(s). The polymer in the crosslinked body of the invention may correspond to the ring of the rotaxane structure or to the shaft of the rotaxane structure. Since the mechanical bonding with the rotaxane structure is not a weak bond as in an intermolecular force (van der Waals force), the crosslinked body of the invention is excellent in the characteristics. Also, the mechanical bonding with the rotaxane structure is debonded, for example, by heating or the like, so that the crosslinked body of the invention is easy in the decrosslinking and excellent in the recycling property.

In the crosslinked body of the invention, when the polymer corresponds to the ring of the rotaxane structure, as a repeating unit of the polymer is mentioned a repeating unit containing a large cyclic structure resulted from a large cyclic molecule such as crown ether, cyclodextrin, large cyclic peptides, cyclophanes, calixarenes, silacrown ethers, cryptands or the like, and the large cyclic structure is preferable to be 24-membered ring or more. Among them, a polymer having a large cyclic structure resulted from crown ether as the repeating unit, i.e. polycrown ether is preferable.

As a crown ether ring of such a polycrown ether are mentioned 24-crown-8 (hole size: 4.0 Å), 27-crown-9 (hole size>4.0 Å), 30-crown-10 (hole size>4.0 Å) and so on. Among the polycrown ethers, a polycrown ether having a crown ether unit of 24-membered ring is further preferable, and particularly a polycrown ether having a crown ether unit represented by the formula (I) is preferable.

As the polycrown ether is mentioned a polymer having a repeating united by the following formula (V), (VI), (VII) or (VIII):

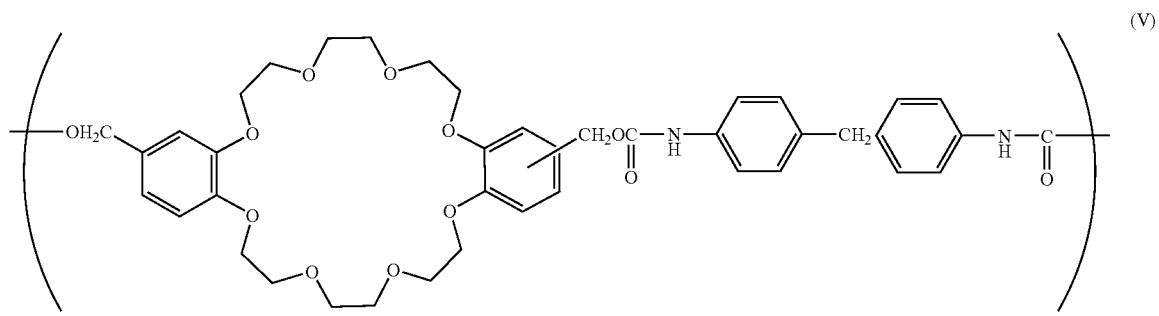

(V)

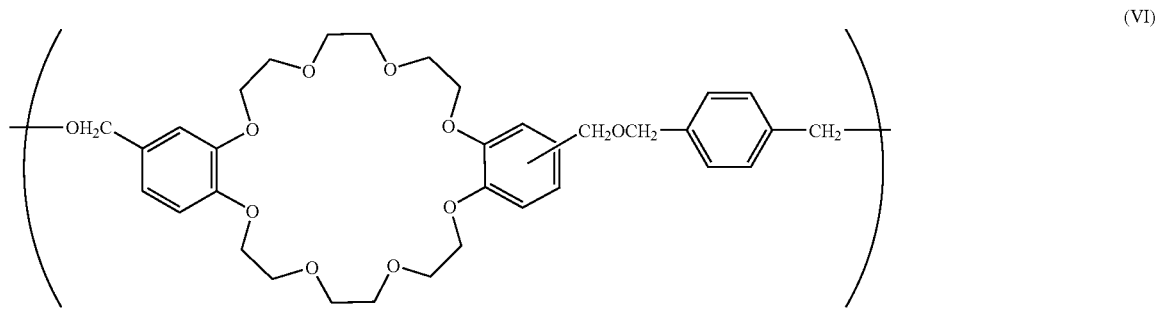

(VI)

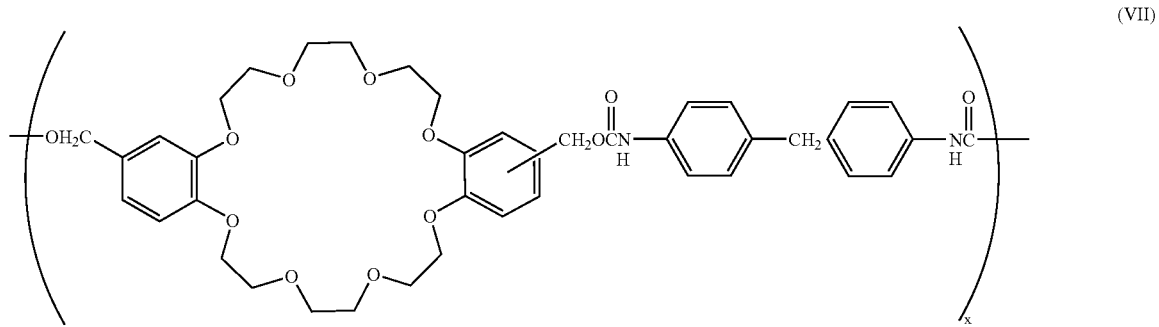

(VII)

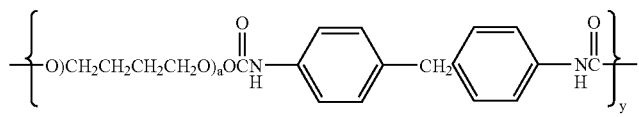

(wherein n is an integer of 1–100000 and x is an integer of 5–95 and y is an integer of 95–5)

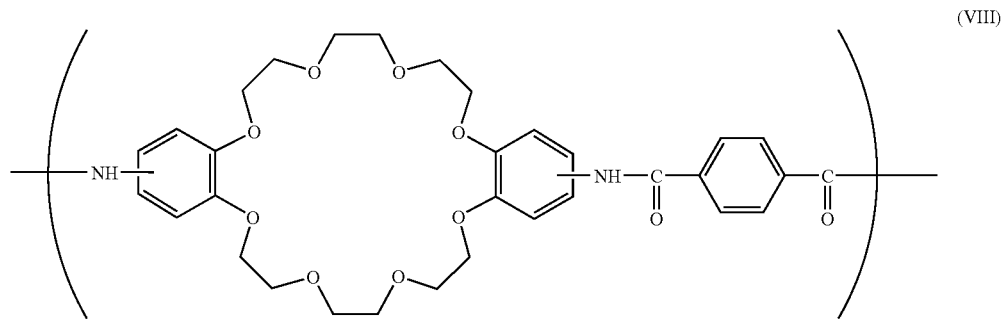

(VIII)

The polycrown ether can be synthesized from a monomer having a crown ether unit by an ordinary polymer synthetic technique. For example, the polycrown ether of the formula (V) can be produced by polyaddition of an alcohol derivative of dibenzo-24-crown ether-8 and diisocyanate in N,N-dimethylacetoamide (DMAc), in which the alcohol derivative of crown ether and diisocyanate are connected through urethane bond. Moreover, the polycrown ether of the formula (V) provides a strong and transparent film through casting. The reaction formula is shown as follows.

ammonium salts having two urethane bonds. Among them are preferable a bifunctional ammonium salt having disulfide bond represented by the following formula (II):

$$(R^1-N^+H_2-R^2-S-S-R^2-N^+H_2-R^1)\cdot 2X^- \quad \text{(II)}$$

(wherein $R^1$ is a bulky group larger than a hole size of the crown ether unit in the polycrown ether, $R^2$ is a bivalent hydrocarbon residue, which may include a hetero atom, and $X^-$ is a monovalent anion), and a bifunctional ammonium

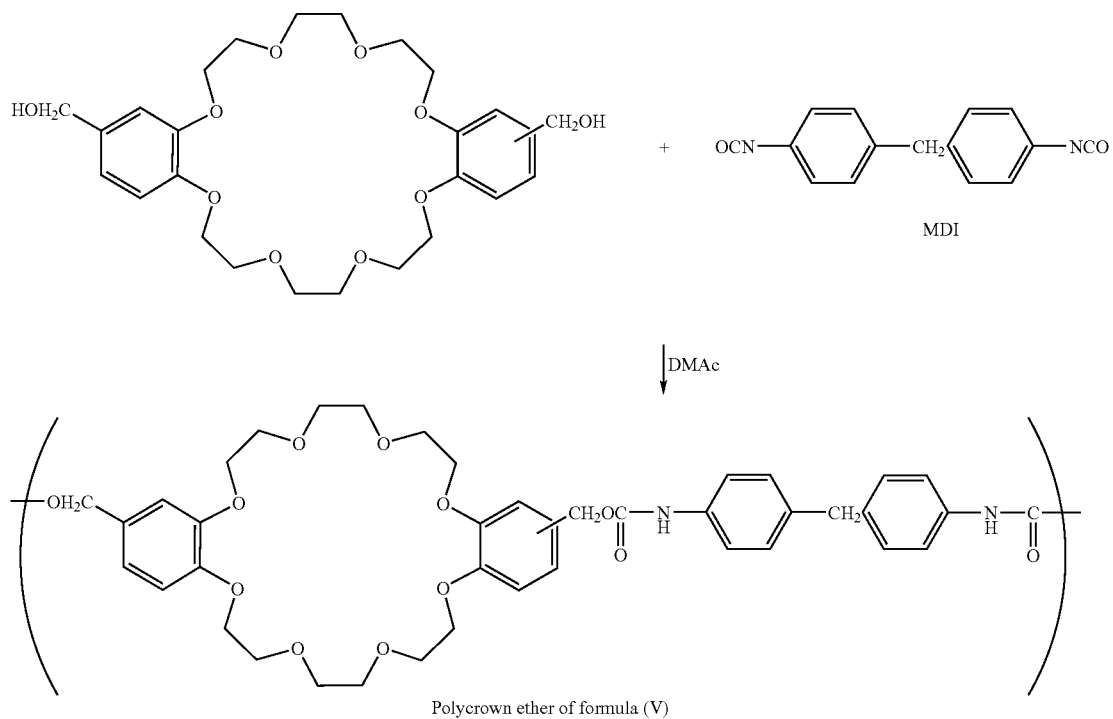

Polycrown ether of formula (V)

When the polymer corresponds to the ring of the rotaxane structure, the molecule corresponding to the shaft of the rotaxane structure is a compound in which a diameter in a central portion of the molecule is smaller than a diameter of a cavity portion of the large cyclic structure in the polymer and a bulky group larger than the cavity of the large cyclic structure in the polymer is existent in each terminal of the molecule. Concretely, there are mentioned bifunctional ammonium salts having disulfide bond, and bifunctional salt having two urethane bonds in its molecule represented by the following formula (III):

$$(R^1-N^+H_2-R^3-OCONH-R^4-NHCOO-R^3-N^+H_2-R^1)\cdot 2X^- \quad \text{(III)}$$

(wherein $R^1$ is a bulky group larger than a hole size of the crown ether unit in the polycrown ether, $R^3$ and $R^4$ are independently a bivalent hydrocarbon residue, which may include a hetero atom, and $X^-$ is a monovalent anion).

The above bifunctional ammonium salt has a structure that an outer diameter of a central portion in the molecule is smaller than an inner diameter of a crown ether ring of the polycrown ether corresponding to the ring and a bulky group larger than the inner diameter (hole size) of the crown ether ring is bonded to each terminal of the molecule. Also, this ammonium salt has two quaternizing N atoms in its molecule, and can electrostatically interact with oxygen atoms constituting the crown ether ring of the polycrown ether, and is high in the complexing ratio.

In the formula (II), $R^1$ is independently a bulky group larger than a hole size of a crown ether unit of the polycrown ether, and $R^2$ is independently a bivalent hydrocarbon residue, and $X^-$ is a monovalent anion.

As R1 of the formula (II) is preferable a group having a cyclic structure. As the cyclic structure, there are monocyclic, condensed polycyclic and the like, which may have a substituent(s), and may be either aromatic or alicyclic. Also, a hetero atom may be included as an atom of the ring in addition to carbon atom. Besides, there are mentioned a crosslinked ring, a spiro ring and the like. Even in the monocyclic, when it has one or more bulky substituents such as t-butyl group or the like, the object can be attained. Concretely, $R^1$ includes 3,5-di-t-butylbenzyl group, 3,5-dimethylbenzyl group, 3,5-dinitrobenzyl group, 4-t-butylbenzyl group and so on.

As $R^2$ of the formula (II), mention may be made of alkylene groups such as ethylene group, trimethylene group, hexamethylene group, dodecamethylene group, p-xylylene group and the like.

As X— of the formula (II), mention may be made of $PF_6^-$, $CF_3SO_3^-$, $BF_4^-$, $CF_3CO_2^-$ and so on.

As the ammonium salt of the formula (II) is preferable a compound wherein $R^1$ is 3,5-di-t-butylbenzyl group, $R^2$ is ethylene group and X— is $PF_6^-$, i.e. a compound represented by the following formula (IX):

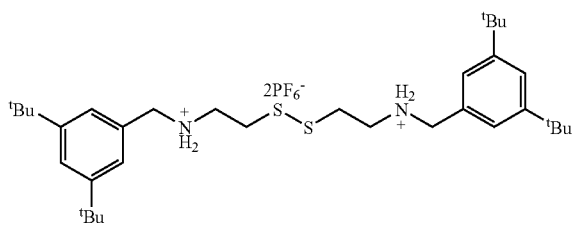

(IX)

When the crosslinked body of the invention consists of the polycrown ether and the bifunctional ammonium salt having disulfide bond, this crosslinked body can be produced by crosslinking the polycrown ether and the bifunctional ammonium salt having disulfide bond in the presence of thiols through thiol-disulfide exchange reaction. Also, the crosslinked body can be decomposed into the original polycrown ether and the bifunctional ammonium salt having disulfide bond by using thiols as a catalyst for recycling. In the invention, the crosslinked body is produced by crosslinking the polycrown ether through mechanical bonding with the rotaxane structure without apparently causing the formation of chemical bond, so that no flaw is caused in the polycrown ether as a main chain.

Figure 5:
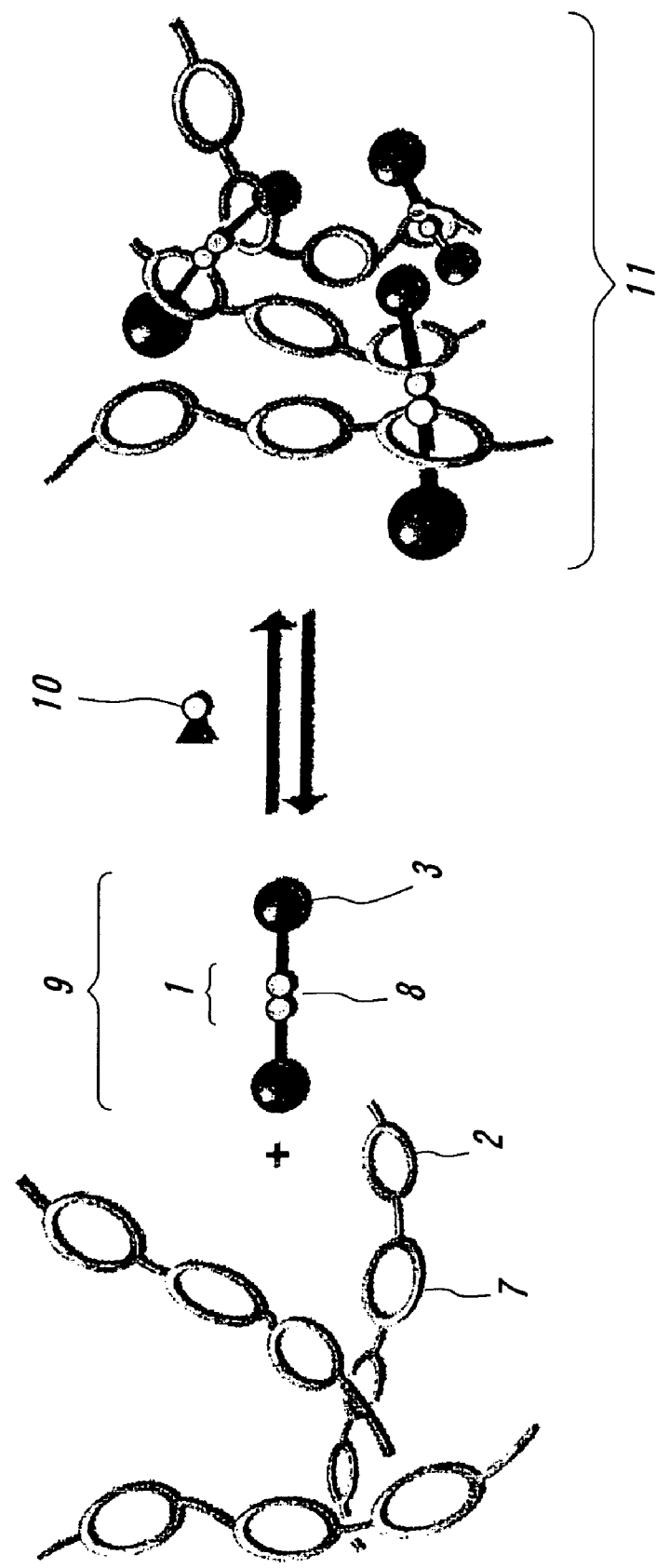
FIG. 5 is a conceptual view of a crosslinked body according to the invention.

As being concretely explained with reference to FIG. 5, the crosslinked body 11 of the invention is produced by crosslinking the polycrown ether 7 and the bifunctional ammonium salt 9 having disulfide bond 8 in the presence of the thiols 10. Also, the resulting crosslinked body 11 can be returned to the polycrown ether 7 and the ammonium salt 9 by decrosslinking in the presence of the thiols 10. In this case, the thiol-disulfide exchange reaction is an equilibrium reaction, so that it is possible to conduct the crosslinking and the decrosslinking by properly selecting the reaction conditions and the kind of thiols used.

The thiols are not particularly limited, but include methyl mercaptan, ethyl mercaptan, allyl mercaptan, mercaptoethanol, thiodiglycol, cysteine, dithiothreitol, benzyl mercaptan, benzene thiol, a compound represented by the following formula (IV):

$$(R^1-N^+H_2-R^2-SH)\cdot X^- \qquad (IV)$$

(wherein $R^1$, $R^2$ and $X^-$ are the same meaning as mentioned above) and so on.

The compound of the formula (VI) is a reduction type thiol of the bifunctional ammonium salt used. Among them, the compound of the formula (IV) is preferable from a viewpoint of the recycling of the crosslinked body, and in this case, the bifunctional ammonium salt used can be recovered in a higher yield.

On the other hand, $R^1$ of the formula (III) is a bulky group larger than the hole size of the crown ether unit in the polycrown ether and may include the same groups as mentioned in $R^1$ of the formula (I). Also, $R^3$ and $R^4$ of the formula (III) are independently a bivalent hydrocarbon residue and may include the same residues as mentioned in $R^2$ of the formula (II). As the compound of the formula (III) is preferable a compound wherein $R^1$ is 3,5-di-t-butylbenzyl group, $R^3$ is trimethylene group, $R^4$ is hexamethylene group and $X^-$ is $PF_6^-$, i.e. a compound represented by the following equation (X):

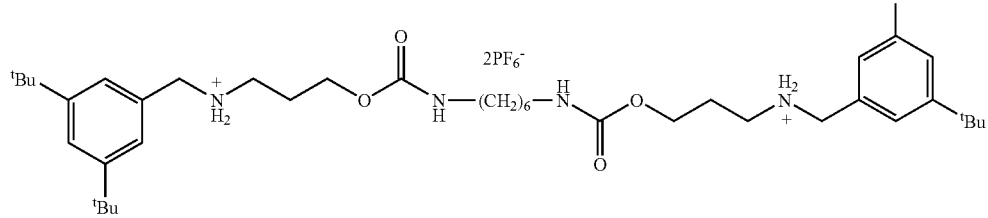

(X)

When the crosslinked body of the invention consists of a polycrown ether and a bifunctional ammonium salt having two urethane bonds in its molecule, this crosslinked body can be synthesized by producing a pseudorotaxane from an ammonium salt having a bulky group in its one terminal and a hydroxyl group in the other terminal and a crown ether having a functional group for polymerization, adding a diisocyanate to synthesize [3]rotaxane consisting of one shaft and two polymerizable rings and polymerizing with the functional group of the crown ether. The above functional group is not particularly limited. For example, in case of an amino group, the crosslinked body can be obtained by polycondensing with dicarboxylic acid or a chloride thereof.

Figure 6:
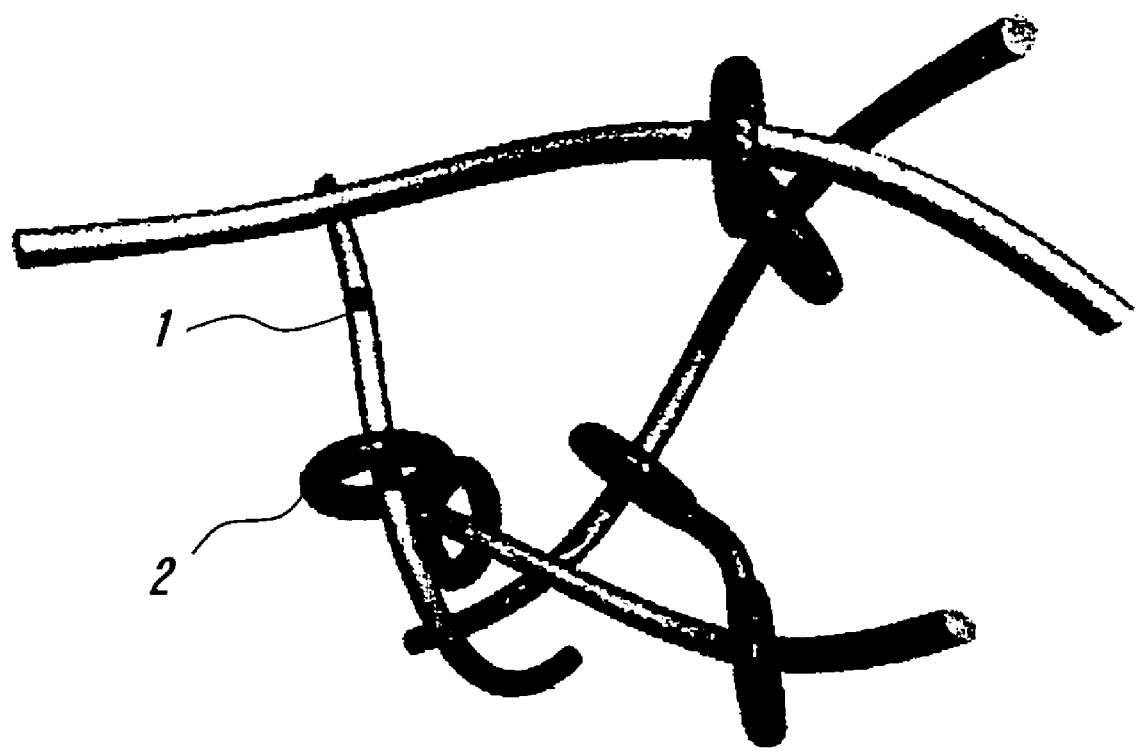
FIG. 6 is a conceptual view of another crosslinked body according to the invention.

In the crosslinked body of the invention, when the polymer corresponds to the shaft of the rotaxane structure, the size of the polymer is required to be smaller than an inner diameter of a ring of a compound having a large cyclic structure as mentioned later. As the polymer is mentioned polyurethane or the like. As the polyurethane may be mentioned a polyurethane having a repeating unit represented by the following formula (XI):

the crosslinked body in which the polymer corresponds to the shaft of the rotaxane structure is shown in FIG. 6. In this figure, the crosslinked body is formed through mechanical bonding with the rotaxane structure in which the polymer is a shaft 1 and the molecule having two large cyclic structures in its molecule is a ring 2.

The crosslinked body of the invention is high in the swelling property. Therefore, it can be used as an absorbent for various solvents. Also, it can be utilized as an alternative for the conventional polymer materials. Further, it is excellent in the recycling property and small in the impact on the environment.

The production method for the crosslinked body of the invention is not particularly limited, but includes (i) a method of crosslinking a polymer having a plurality of large cyclic structures and a bifunctional ammonium salt having disulfide bond in the presence of thiols through mechanical bonding with a rotaxane structure, (ii) a method of polymerizing [3]rotaxane comprised of one shaft and two poly-

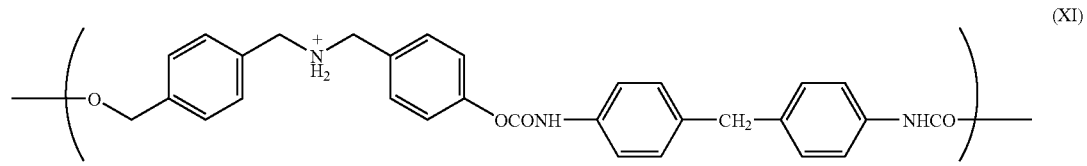

In case that the polymer corresponds to the shaft of the rotaxane structure, the molecule corresponding to the ring of the rotaxane structure is required to have two or more large cyclic structures in its molecule. As such a molecule are concretely mentioned biscrown ether, biscyclodextrin, biscalixarene, biscucurbituryl and derivatives thereof. Among them, biscrown ethers are preferable. The crown ether ring constituting the biscrown ether is preferable to be 24-membered ring or more. As such a crown ether ring are mentioned 24-crown-8 (hole size: 4.0 Å), 27-crown-9 (hole size >4.0 Å), 30-crown-10 (hole size >4.0 Å) and so on. Among the biscrown ethers is particularly preferable a compound represented by the following formula (XII):

merizable rings at a portion of the ring, (iii) a method of polymerizing a pseudorotaxane formed by inserting a polymerizable chain molecule into each ring of a compound having two large cyclic structures at a portion of the chain molecule, and (iv) a method of crosslinking a polymer having a plurality of large cyclic structures and a chain molecule corresponding to a shaft having end caps under heating.

The above method (i) is a method utilizing thiol-disulfide exchange reaction. In this method, the disulfide bond of the bifunctional ammonium salt having disulfide bond is cleaved in the presence of thiols, during which the ammonium salt is inserted into the large cyclic structure portions

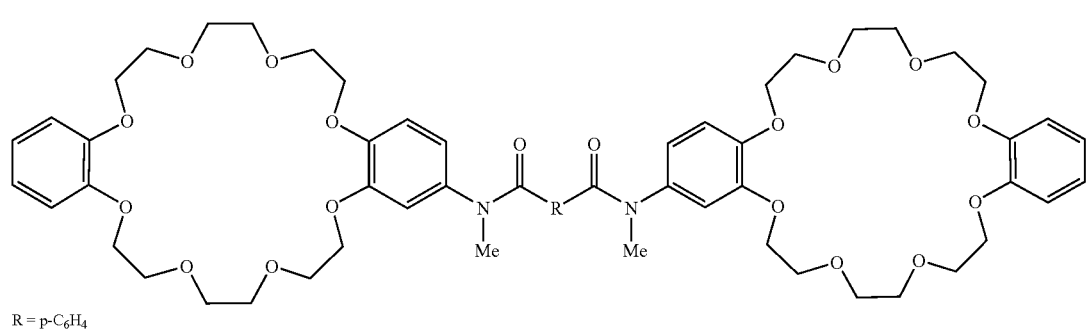

R = p-C$_6$H$_4$

In case that the crosslinked body of the invention consists of a polyurethane and a biscrown ether, this crosslinked body can be obtained, for example, by producing a pseudorotaxane from the biscrown ether and an ammonium salt having hydroxyl groups at its both terminals and adding diisocyanate to conduct polyaddition. A conceptual view of of the polymer. When the large cyclic portion of the polymer is a crown ether, quaternizing N atoms electrostatically interact with oxygen atoms of the crown ether ring to easily produce the rotaxane structure.

As the above polymer having a plurality of large cyclic structures are mentioned polymers with a repeating unit containing a large cyclic structure resulted from a large cyclic molecule such as crown ether, cyclodextrin, large cyclic peptides, cyclophanes, calixarenes, silacrown ethers, cryptands or the like, and the large cyclic structure is preferable to be 24-membered ring or more. Among them, a polymer having a large cyclic structure resulted from crown ether as the repeating unit, i.e. polycrown ether is preferable. Moreover, the polycrown ether is the same as previously mentioned. Also, the bifunctional ammonium salt having disulfide bond and the thiols are the same as previously mentioned.

The above method (ii) is a method of connecting rotaxanes to each other through covalent bonding, in which the stability is high as compared with the crosslinked body utilizing the above disulfide bond. In this case, the molecule corresponding to the ring of the rotaxane has a functional group, and the polymerization is conducted by utilizing the functional group. As the molecule constituting the ring of [3]rotaxane are mentioned large cyclic molecules such as crown ether, cyclodextrin, large cyclic peptides, cyclophanes, calixarenes, silacrown ethers, cryptands and the like. Among them, crown ether is preferable, and a crown ether of 24-membered ring is further preferable, and a crown ether represented by the following formula (XIII) is particularly preferable.

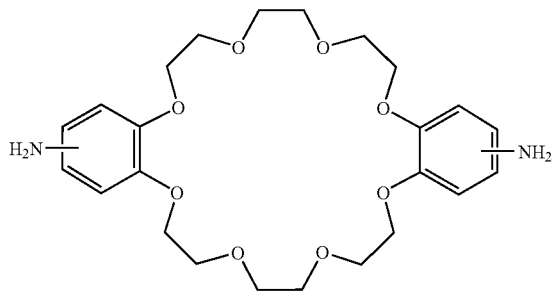

(XIII)

On the other hand, the molecule constituting the shaft of the rotaxane is a molecule being small in a size of a central portion of the molecule as compared with a cavity portion of the above large cyclic molecule and large in the bulkiness of the molecule terminal. As such a molecule are mentioned bifunctional ammonium salts having two urethane bonds. Among them, an ammonium salt represented by the formula (III) is preferable, and an ammonium salt represented by the formula (X) is further preferable.

In this case, the synthesis of [3]rotaxane may be conducted by a method wherein the shaft is inserted into the two rings and the end caps are bonded thereto, or by a method wherein a pseudorotaxane is produced from an ammonium salt having a bulky group in one terminal and hydroxyl group in the other terminal and a crown ether and then diisocyanate is added to conduct reaction between the hydroxyl group and the isocyanate group.

The above method (iii) is a method of connecting pseudorotaxanes to each other through covalent binding, in which the stability is high as compared with the crosslinked body utilizing the above disulfide bond. As the compound having two large cyclic structures are mentioned biscrown ether, biscyclodextrin, biscalixarene, biscucurbituryl and derivatives thereof. Among them, biscrown ethers are preferable. Moreover, the biscrown ether is the same as previously mentioned. On the other hand, the chain molecule capable of inserting into the ring is not particularly limited unless the it is small in the size than the inner diameter of the compound having two large cyclic structures and has a functional group for polymerization.

The above method (iv) is a method wherein rotaxane bond is produced by a so-called slip method to obtain a crosslinked body. In this case, the polymer having a plurality of large cyclic structures is the same as mentioned in the method (i). On the other hand, the chain molecule having the end caps is smaller in the size of the central portion of the molecule than the inner diameter of the large cyclic structure and has a bulky group being larger than the diameter of the large cyclic structure at room temperature but smaller than the inner diameter of the large cyclic structure at a higher temperature in its terminal. Such a group is properly selected in accordance with the inner diameter of the large cyclic structure.

The crosslinked body of the invention can be recycled by decrosslinking under heating. In this method, the end cap group comes through the ring of the rotaxane under heating, so that the cleavage of the chemical bond is not accompanied. Therefore, the recovery product obtained by this method is high in the convenience.

Also, the crosslinked body formed through the mechanical bonding between the polymer having a plurality of large cyclic structures and a bifunctional ammonium salt having disulfide bond with the rotaxane structure can be recycled by decrosslinking in the presence of thiols. Since the thiol-disulfide exchange reaction is an equilibrium reaction as previously mentioned, the selectivity of the crosslinking and the decrosslinking can be operated by properly selecting the reaction conditions.

As the thiols used in the decrosslinking, use may be made of the aforementioned thiols, but thiols of type for reducing the bifunctional ammonium salt having disulfide are preferable, and in this case, the bifunctional ammonium salt used can be recovered in a high yield. Concretely, when using a bifunctional ammonium salt represented by the following formula (II):

(II)

(wherein $R^1$, $R^2$ and $X^-$ are the same meanings as mentioned above), it is preferable to use thiols represented by the following formula (IV):

(IV)

(wherein $R^1$, $R^2$ and $X^-$ are the same meanings as mentioned above).

The invention will be described in detail with reference to the following examples, but the invention is not limited to these examples.

SYNTHESIS EXAMPLE 1 OF POLYCROWN ETHER

A polycrown ether represented by the formula (V) is synthesized by polyadding 1.48M of an alcohol derivative of dibenzo-24-crown ether-8 and 1.41M of 4,4'-diphenylmethane diisocyanate (MDI) in N,N-dimethylacetoamide (DMAc) at room temperature for 10 hours. The resulting polycrown ether has a glass transition temperature (Tg) of 81° C. as measured by a differential scanning calorimeter, a 10% weight reduction temperature ($T_{d10}$) of 254° C. as measured by a thermogravimetric measuring meter, a number average molecular weight (Mn) converted into polystyrene of 5100 as measured by a GPCm and a molecular weight distribution (Mw/Mn) of 7.1. The reaction formula is shown as follows.

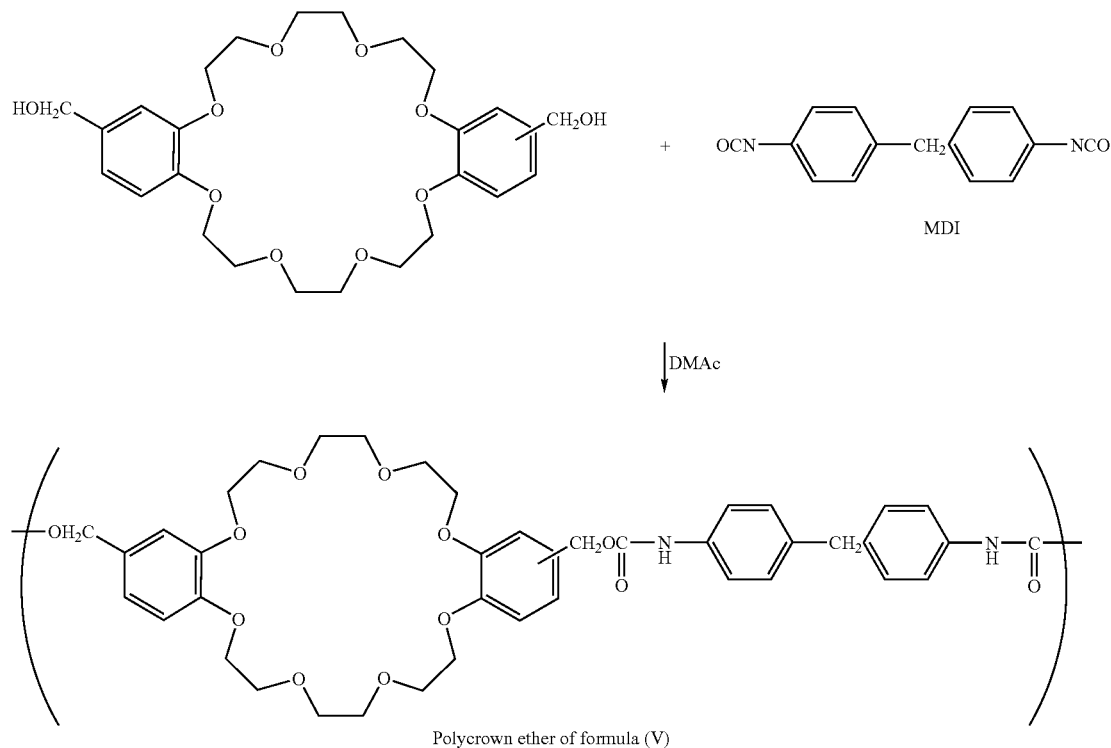

Polycrown ether of formula (V)

SYNTHESIS EXAMPLE 2 OF POLYCROWN ETHER

A polycrown ether of the formula (VI) is synthesized by an ordinary method. The resulting polycrown ether has Tg of 18° C., $T_{d10}$ of 310° C., a number average molecular weight (Mn) of 2200 and a molecular weight distribution (Mw/Mn) of 1.5.

SYNTHESIS EXAMPLE 3 OF POLYCROWN ETHER

A polycrown ether of the formula (VII) is synthesized by an ordinary method. The resulting polycrown ether has Tg of 15° C., $T_{d10}$ of 324° C., a number average molecular weight (Mn) of 125000 and a molecular weight distribution (Mw/Mn) of 80.

EXAMPLE 1

The thus obtained polycrown ether of the formula (V) and the bifunctional ammonium salt of the formula (IX) are dissolved in a mixed solution of chloroform and acetonitrile and then added with benzene thiol (PhSH) and left to stand at 50° C. In this case, the concentration of the polycrown ether of the formula (V) is 0.25 M as a concentration of crown unit, and the concentration of the bifunctional ammonium salt of the formula (IX) is 0.060 M and the concentration of benzene thiol is 0.012 M. As a result, it is observed to gradually increase the viscosity of the mixed solution and the precipitation of gel occurs after 20 hours. As the gel is washed with chloroform and methanol, a crosslinking type polyrotaxane (crosslinked body) is quantitatively obtained. The thus obtained gel is colorless and elastic and becomes very hard in the drying. The obtained crosslinking type polyrotaxane has a glass transition point (Tg) of 60.4° C. and a 10% weight reduction temperature ($T_{d10}$) of 203° C. The reaction formula is shown as follows.

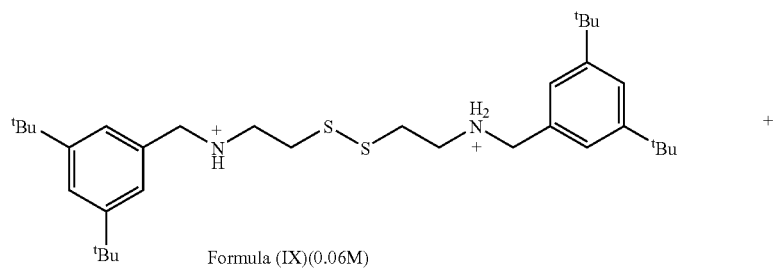

Formula (IX)(0.06M)

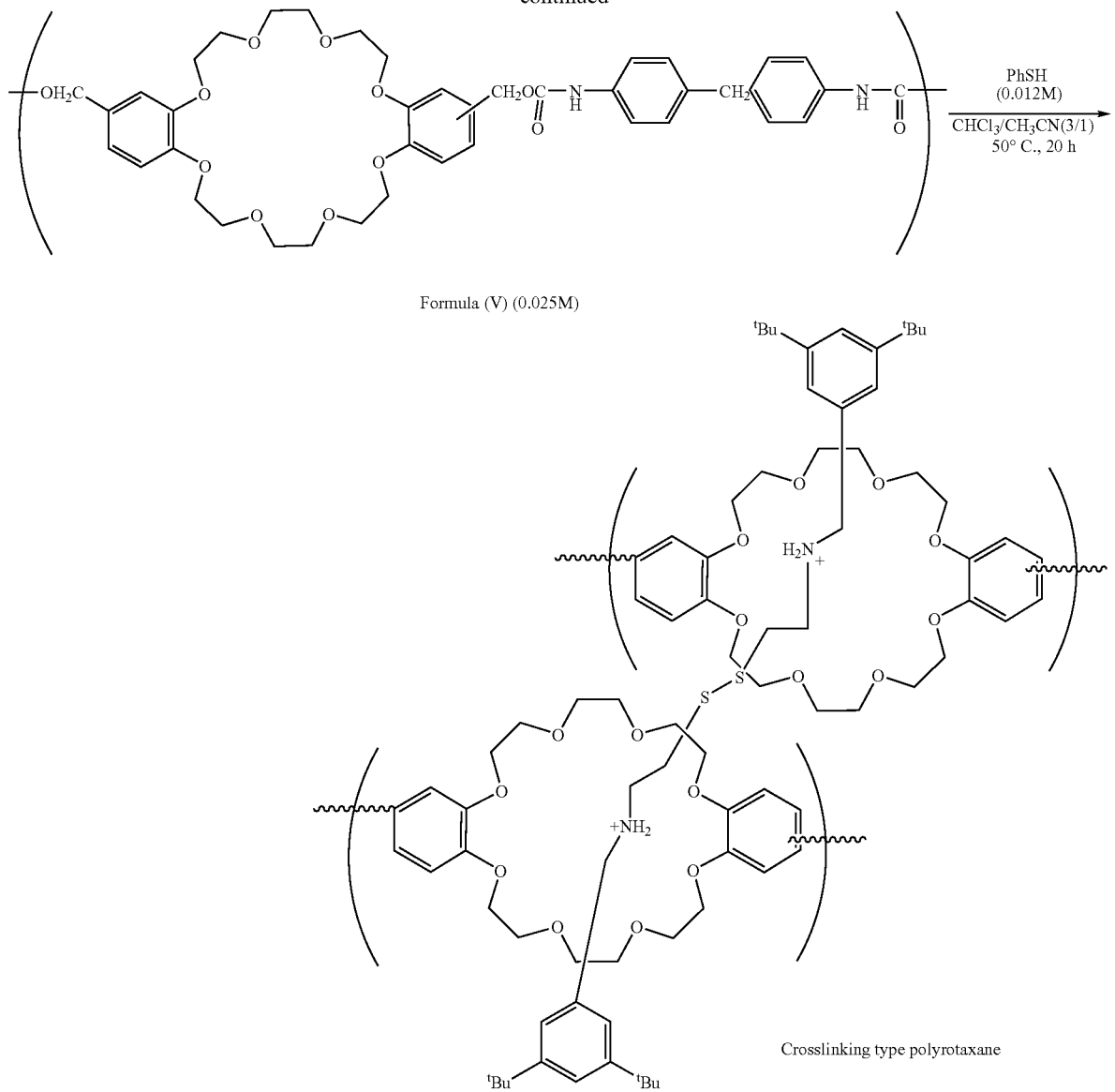

Formula (V) (0.025M)

Crosslinking type polyrotaxane

As a control experiment, the same experiment as mentioned above is carried out without adding the ammonium slat of the formula (IX) or benzene thiol and hence the gel is not formed. As a result, it has been confirmed that the formation of the gel depends upon the mechanical bonding of rotaxane.

Figure 7:
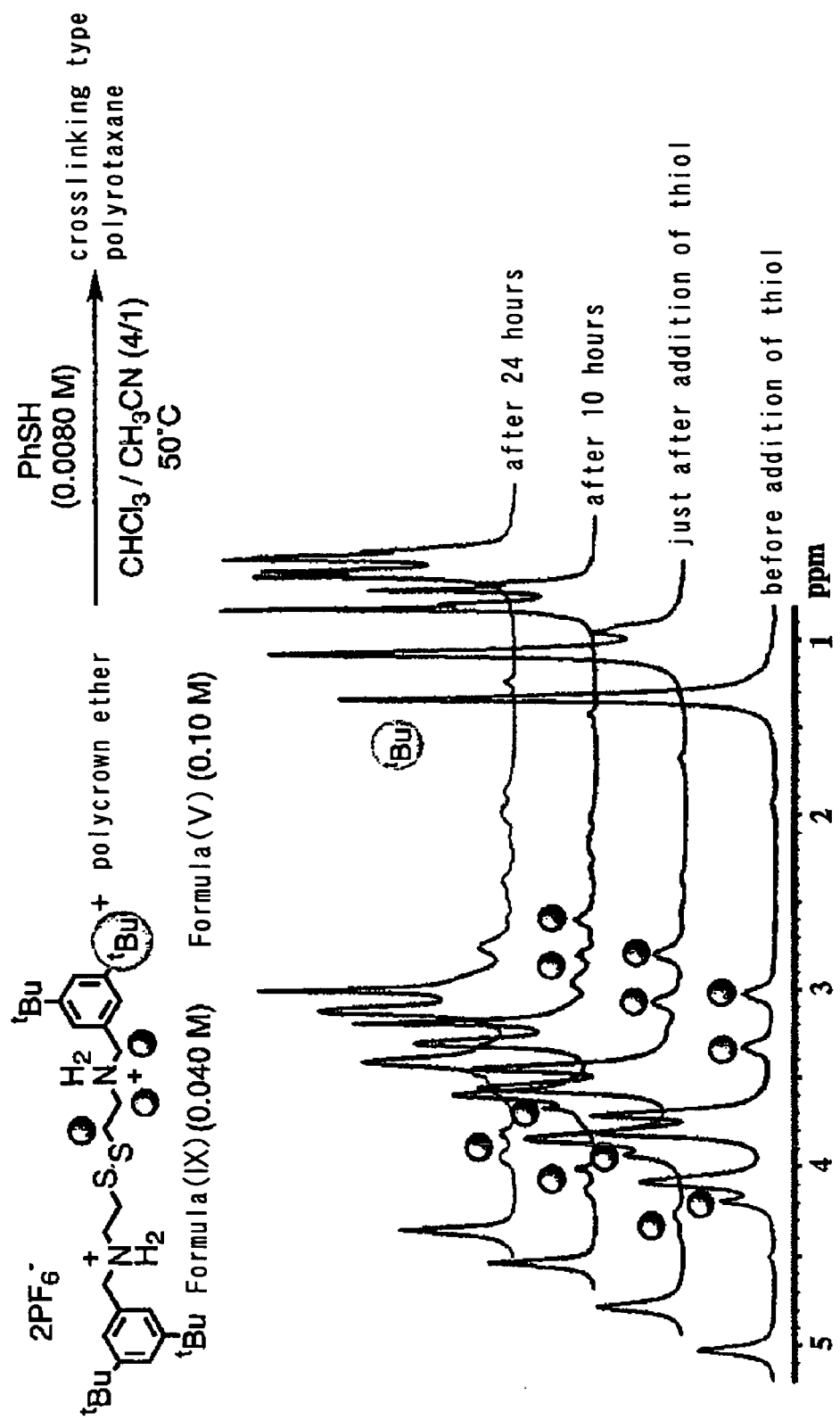
FIG. 7 is a $^1$H-NMR spectrum with the lapse of time after benzene thiol is added to a mixture of a polycrown ether of the formula (V) and an ammonium salt of the formula (IX).

Then, the formation procedure of the crosslinked body (gelation) is followed up by $^1$H-NMR. The measurement of $^1$H-NMR is carried out with time by charging the polycrown ether of the formula (V), ammonium salt of the formula (IX) and benzene thiol into a tube for the measurement of NMR. In FIG. 7 are shown 1H-NMP spectra before the addition of benzene thiol, just after the addition, after 10 hours of the addition and after 24 hours of the addition. A peak corresponding to hydrogen of t-Bu group in the ammonium salt of the formula (IX) found at about 1.3 ppm is divided by the addition of benzene thiol, and such a division becomes large with the lapse of time. Also, it can be confirmed that a peak corresponding to hydrogen in a benzyl position of the ammonium salt of the formula (IX) found at about 4.2 ppm is shifted to a low magnetic field side with the lapse of time.

Figure 8:
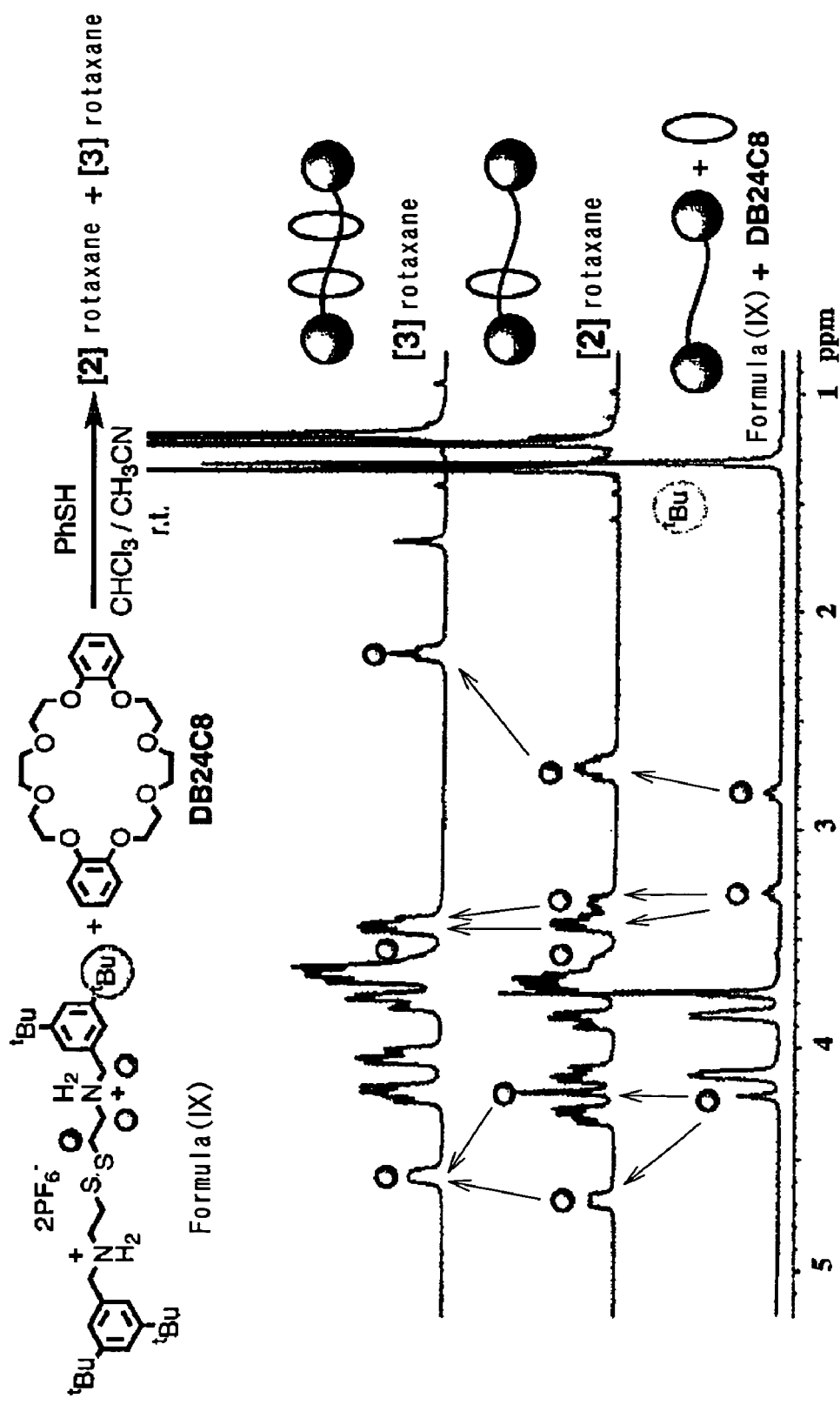
FIG. 8 is a $^1$H-NMR spectrum of a mixture of [2]rotaxane, [3]rotaxane, an ammonium salt of the formula (IX) and DB24C8 (crown ether).

In this case, the identification of peaks resulted from the rotaxane structure is confirmed from 1H-NMR spectra of [2]rotaxane, [3]rotaxane and a mixture of the ammonium salt of the formula (IX) and DB24C8 (crown ether) shown in FIG. 8.

Then, the crosslinking reaction is carried out by changing the addition amount of benzene thiol to measure the swelling degree and glass transition point of the resulting crosslinked body. The results are shown in Table 1. Moreover, the glass transition point is measured by a differential scanning calorimeter (DSC), and the swelling degree is determined by the following equation by immersing the gel into chloroform at room temperature for 30 hours.

Swelling degree(%)=(gel volume after swelling−gel volume in drying)/gel volume in drying×100

TABLE 1

|  | Concentration of formula (V) (M)*1 | mol % of formula (IX)*2 | Swelling degree (%) | Tg (° C.) |
|---|---|---|---|---|
| Example 2 | 0.25 | 50 | 75 | 60.4 |
| Example 3 | 0.25 | 25 | 97 | 53.3 |
| Example 4 | 0.25 | 10 | 238 | 31.8 |
| Example 5 | 0.17 | 25 | 167 | 48.8 |

*1: molar concentration (mol/L) of crown unit in polycrown ether of the formula (V)
*2: mol % to crown unit in polycrown ether of the formula (V)

As seen from Examples 2–4, the swelling degree is increased and the glass transition point is lowered by decreasing the charging ratio to the crown unit of the ammonium salt as a shaft. From this fact it is clear that the cross-linking ratio can be controlled by changing the molar ratio of the polycrown ether to the ammonium salt in the crosslinked body of the invention. Also, as seen from Example 5, the swelling degree is increased and the glass transition point is lowered by decreasing the concentration at the same charging ratio as in Example 3. From this fact it is clear that the crosslinking ratio can be also controlled by the concentration.

Then, an influence of the solvent upon the swelling degree of the crosslinked polymer is tested. In this test, the crosslinked polymer obtained in Example 4 is used and the swelling degree is measured in the same manner as mentioned above by changing only the solvent. The results are shown in Table 2.

TABLE 2

|  | Solvent | Swelling degree (%) |
|---|---|---|
| Example 6 | DMF | 1400 |
| Example 7 | DMSO | 840 |
| Example 8 | $CH_3CN$ | 62 |
| Example 9 | $CH_3OH$ | 27 |

As seen from Table 2, the swelling degree can be increased by the solvent having a high solubility to the main chain polymer such as dimethyl formamide (DMF), dimethyl sulfoxide (DMSO) or the like.

EXAMPLE 10

A polycrown ether of the formula (VI) is crosslinked the same manner as in Example 1. As a result, a crosslinking type polyrotaxane obtained from the polycrown ether of the formula (VI) has a glass transition point (Tg) of 9.2° C. and a 10% weight reduction temperature ($T_{d10}$) of 189° C.

EXAMPLE 11

A polycrown ether of the formula (VII) is crosslinked the same manner as in Example 1. As a result, a crosslinking type polyrotaxane obtained from the polycrown ether of the formula (VII) has a glass transition point (Tg) of 87° C. and a 10% weight reduction temperature ($T_{d10}$) of 234° C.

SYNTHESIS EXAMPLE 1 OF [3]ROTAXANE 5.00 g (22.9 mmol) of 3,5-di-tert-butyl benzaldehyde and 1.72 g (22.9 mmol) of 3-amino-1-propanol are dissolved in 60 mL of toluene and refluxed in an argon atmosphere for 2 hours. After the solvent is removed under a reduced pressure, 200 mL of methanol and 2.57 g (57.4 mmol) of boron hydride are added and the stirring is continued at room temperature for 15 hours. After the solvent is removed under a reduced pressure, the residue is extracted with chloroform and washed with an aqueous solution of 1 M HCl and an aqueous solution of 10% NaOH one time and dried on anhydrous magnesium sulfate, and then the solvent is removed under a reduced pressure. The resulting residue is purified through a silica gel column chromatography (eluting solution: EtOAc) to obtain 3.20 g (11.5 mmol, 50%) of a compound represented by the following formula (XIV):

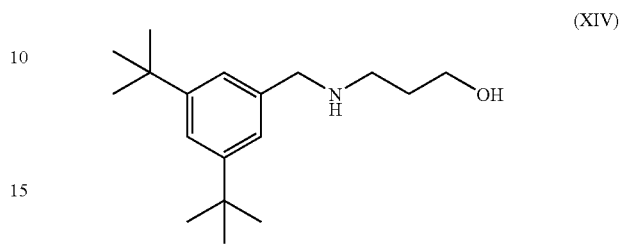

(XIV)

as a colorless oil. 3.2 g (11.5 mmol) of the compound of the formula (XIV) is dissolved in 30 mL of methanol and 30 mL of an aqueous solution of 10% $HPF_6$ is added dropwise with stirring. After methanol is removed under a reduced pressure, the residue is extracted with chloroform and dried on anhydrous magnesium sulfate and the solvent is removed under a reduced pressure to obtain 4.80 g (11.3 mmol, 98%) of a compound represented by the following formula (XV):

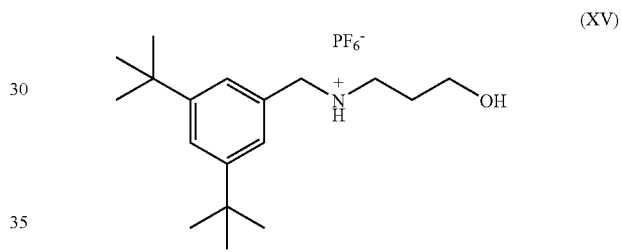

(XV)

as a white solid.

3.00 g (6.69 mmol) of dibenzo-24-crown-8-ether (DB24C8) is dissolved in 50 mL of acetic acid and added with 1.27 mL (16.7 mmol) of 60% nitric acid and then stirred at room temperature for 13 hours. Water is added until a solid is sufficiently precipitated, and then the solid is filtered off under suction. The resulting solid is dried under a reduced pressure and purified by recrystallization in ethanol to obtain 2.41 g (4.48 mmol, 67%) of a compound (dinitrocrown ether) represented by the following formula (XVI):

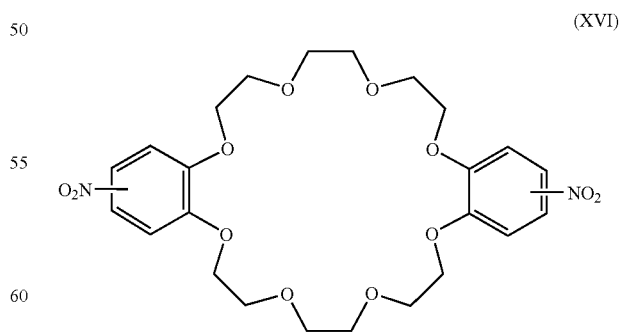

(XVI)

as a yellow solid.

$^1$H-NMR (270 MHz, $CDCl_3$) δ7.90–7.85(2H, dd, $J_1$=8.9 Hz, $J_2$=2.4 Hz, Ar—H) 7.72(2H, d, J=2.4 Hz, Ar—H), 6.86(2H, d, J=2.4 Hz, Ar—H), 4.24–4.13(8H, m, $CH_2$), 3.97–3.83(16H, m, CH$_2$)ppm: m.p. 144.4–145.9° C.: IR(KBr)ν$_{N-O}$=1512, 1277 cm$^{-1}$ 170 mg (0.40 mmol) of the compound of the formula (XV) and 430 mg (0.80 mmol) of the compound of the formula (XVI) are dissolved in 3.5 mL of CH$_3$NO$_2$ and stirred at 70° C. for 1 hour and added with 32 μL (0.20 mmol) of hexamethylene diisocyanate and 24 μL (40 μmol) of di-n-butyltin dilaurate (DBTDL) and then stirred at room temperature for two nights. After the solvent is removed under a reduced pressure, the residue is purified through a preparative liquid chromatography (HPLC) to obtain 240 mg (0.12 mmol, 58%) of a compound (rotaxane) represented by the following formula (XVII):

$^1$H-NMR (270 MHz, CDCl$_3$) δ 7.84–7.81(4H, d, J=8.6 Hz, Ar—H of crown), 7.61(4H, s, Ar—H of crown), 7.18–7.11(6H, m, Ar—H of dumbbel), 6.94–6.90(4H, m, Ar—H of crown), 4.67–4.65(4H, m, ArCH$_2$NH$_2$), 4.20–3.07 (60H, m, CH$_2$), 1.93–1.11(44H, m, CH$_2$ and $^t$Bu)ppm: FAB-MS(m-NBA): m/z 1801.0[M-sPF$_6^-$]

200 mg (0.10 mmol) of the compound of the formula (XVII) and 50 mg of Pd—C are dissolved in 60 mL of a mixed solution of ethyl acetate and methanol (1/1) and replaced with hydrogen and stirred at room temperature for one night. After Pd—C is removed through filtration under suction, the solvent is removed from a filtrate under a reduced pressure to obtain 180 mg (0.097 mmol, 97%) of a compound (rotaxane) represented by the following formula (XVIII):

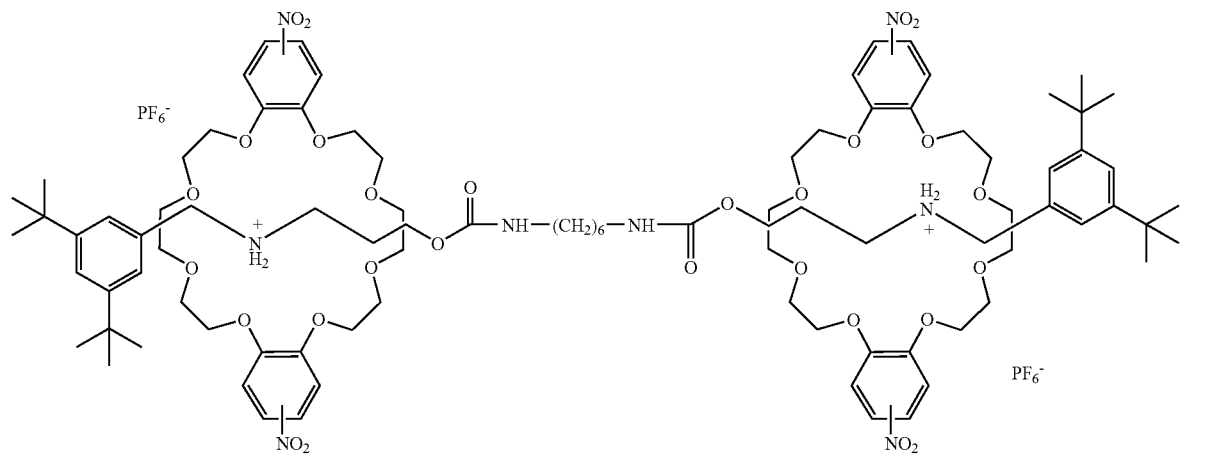

(XVII)

as a colorless solid.

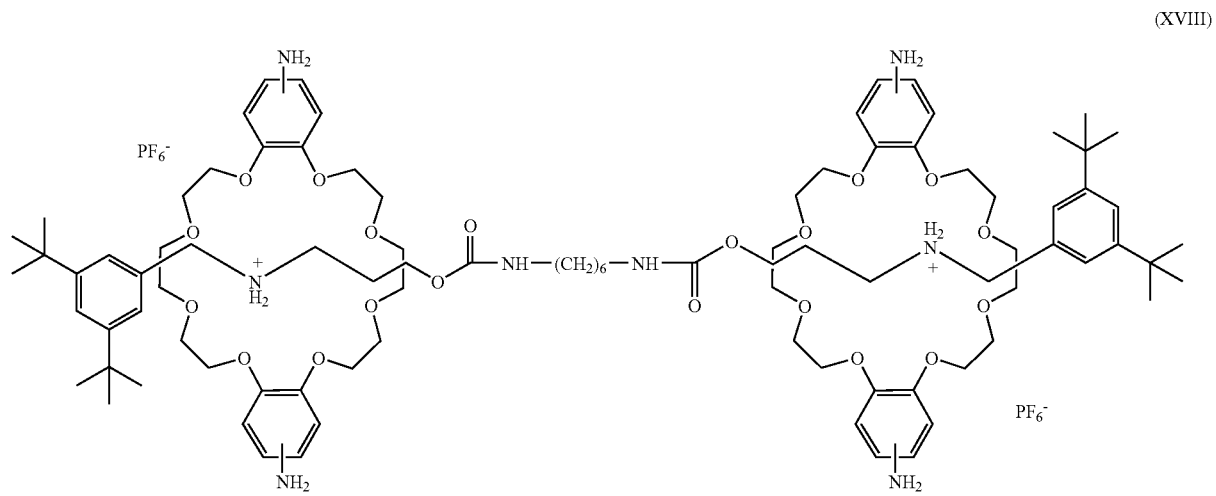

(XVIII)

as a colorless solid.

EXAMPLE 12

180 mg (0.097 mmol) of the compound of the formula (XVIII) is dissolved in 30 mL of THF and 1.1 mL of triethylamine and 60 mg (0.30 mmol) of terephthalic acid chloride dissolved in 3 mL of THF are added dropwise to immediately precipitate a white solid. This white solid is dissolved in DMSO and again precipitated with water to obtain 190 mg of a crosslinked body represented by the following formula (XIX):

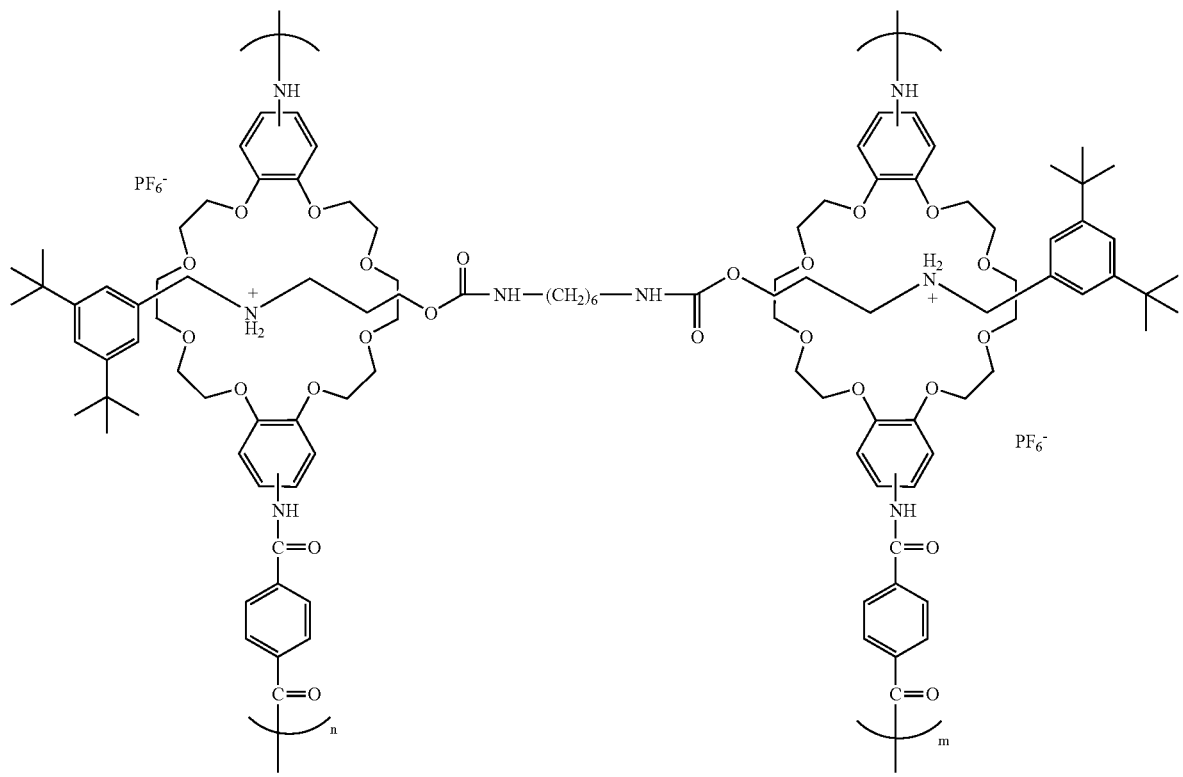

(XIX)

SYNTHESIS EXAMPLE 1 OF BISCROWN ETHER 1.98 g (4.33 mmol) of DB24C8 is dissolved in acetic acid and added with 312 µL (4.11 mmol) of 60% nitric acid and the stirred at room temperature for 13 hours. Water is added until a solid is sufficiently precipitated, and then the solid is filtered. The resulting solid is dried under a reduced pressure and purified by recrystallization with ethanol to obtain 1.42 g (2.90 mmol) of a compound (mononitrocrown ether) represented by the following formula (XX):

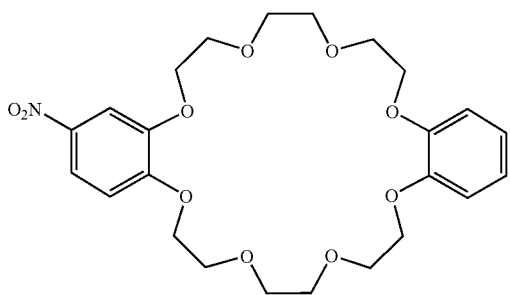

(XX)

as a yellow solid.

$^1$H-NMR (270 MHz, CDCl$_3$) δ7.99–7.86(1H, dd, J$_1$=8.9 Hz, J$_2$=2.4 Hz, Ar—H) 7.72(1H, d, J=2.4 Hz, Ar—H), 6.91–6.86(5H, m, Ar—H), 4.28–4.14(8H, m, CH$_2$), 3.97–3.84(16H, m, CH$_2$)ppm: m.p. 124.0–125.0° C.: IR(KBr)ν$_{N\text{-}0}$=1509,1276 cm$^{-1}$ 0.35 g (0.70 mmol) of the compound of the formula (XX) and 50 mg of Pd—C are dissolved in 100 mL of a mixed solution of ethyl acetate and methanol (1/1) and replaced with hydrogen and stirred at room temperature for one night. After Pd—C is removed through filtration under suction, the solvent is removed from a filtrate under a reduced pressure to obtain a compound represented by the following formula (XXI):

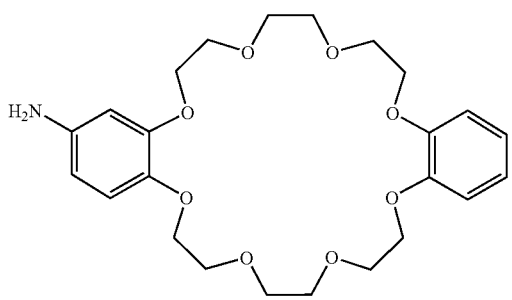

(XXI)

as a colorless crystal. This compound is dissolved in 30 mL of THF and added with 0.50 mL (3.5 mmol) of triethylamine and 70 mg (0.35 mmol) of terephthalic acid chloride dissolved in 10 mL of THF. After the stirring is conducted at room temperature for one night, the precipitated light brown solid is filtered under suction and dried under a reduced pressure to obtain 0.37 g (0.35 mmol, 100%) of a compound (biscrown ether) represented by the following formula (XXII):

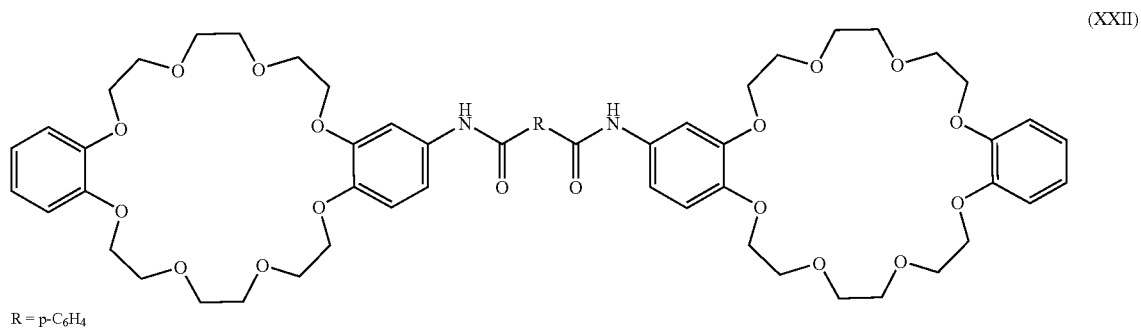

$^1$H-NMR (270 MHz, DMSO-d$_6$) δ10.2(2H, CONH), 8.05 (4H, s, terephthaloyl-H), 7.47(2H, s, Ar—H), 7.32(2H, m, Ar—H), 6.96–6.85(10H, m, Ar—H), 4.06(16H, m, CH$_2$), 3.75(16H, m, CHH), 3.66(16H, d, CH$_2$)ppm 1.63 g (1.54 mmol) of the compound of the formula (XXII) and 2.00 g (50.0 mmol) of sodium hydride (60%, in oil) are suspended in 100 mL of anhydrous DMF and stirred for 30 minutes and then 4.0 mL (64 mmol) of methyl iodide is added and stirred at room temperature for 6 hours. After water and ethyl acetate are added, extraction is conducted with ethyl acetate 3 times and the solvent is removed under a reduced pressure to obtain a yellow oil after ethyl acetate and n-hexane are added, a supernatant is removed through decantation. After an operation that n-hexane is added and stirred and a supernatant is removed through decantation is repeated 3 times, a solid is dried under a reduced pressure. After a high polymer is removed through a preparative GPC, the purification is carried out by recrystallization with ethanol to obtain 1.12 g (1.03 mmol) of a compound (biscrown ether) represented by the following formula (XXIII):

m.p. 162–163° C.: $^1$H-NMR (270 MHz, CDCl$_3$) δ7.10 (4H, s, Ar—H), 6.88(8H, s, Ar—H), 6.85(2H, d, Ar—H), 6.52(2H, s, Ar—H), 4.16–3.73(48H, m, CH$_2$), 3.73(6H, s, CH$_2$)ppm: IR(KBr)ν$_{C=O}$=1647 cm$^{-1}$

EXAMPLE 13

95 mg (0.37 mmol) of a compound represented by the following formula (XXIV):

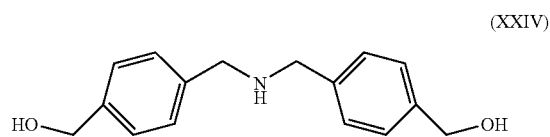

is dissolved in 2.0 mL of CHCl$_3$ and added with 40 μL (0.44 mmol) of CF$_3$SO$_3$H and 200 mg (0.18 mmol) of biscrown ether of the formula (XXIII) and stirred at room temperature for 5 minutes to produce a pseudorotaxane represented by the following formula (XXV):

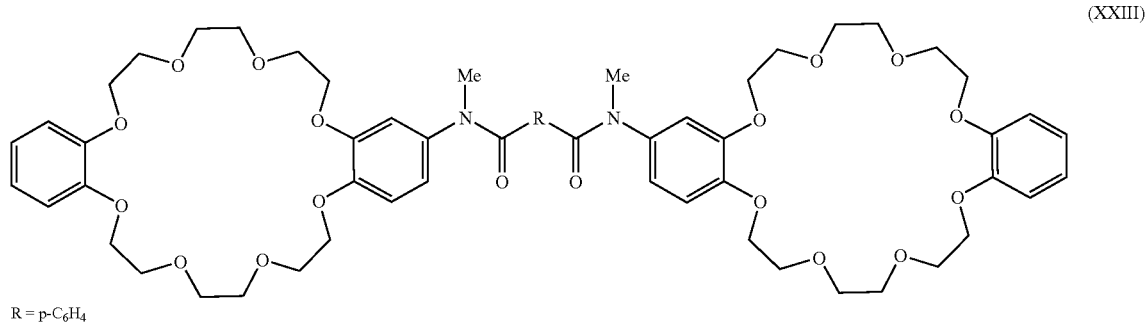

as a white solid.

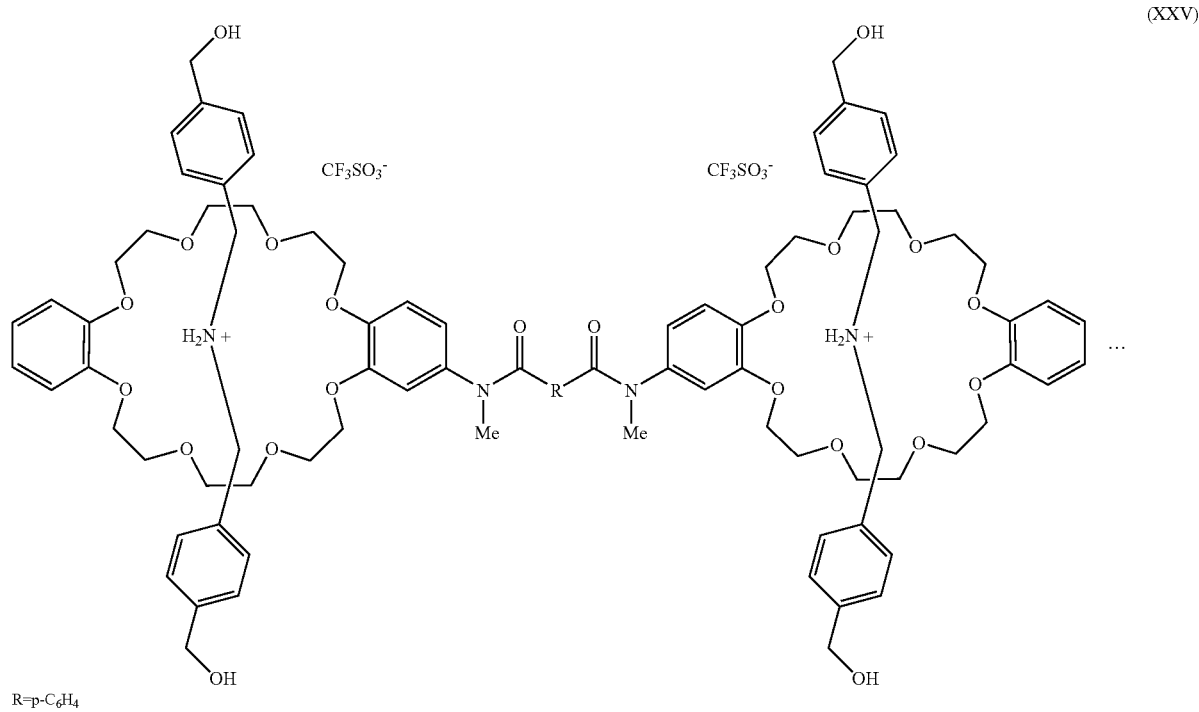
(XXV)
R=p-C$_6$H$_4$
in a system. To the reaction liquid is added 95 mg (0.37 mmol) of methylene bis(4-phenylisocyanate) and further stirred at room temperature for 2 hours to precipitate a colorless and transparent gel. This gel is taken out from the solution and dried to obtain a crosslinked body (210 mg) represented by the following formula (XXVI):
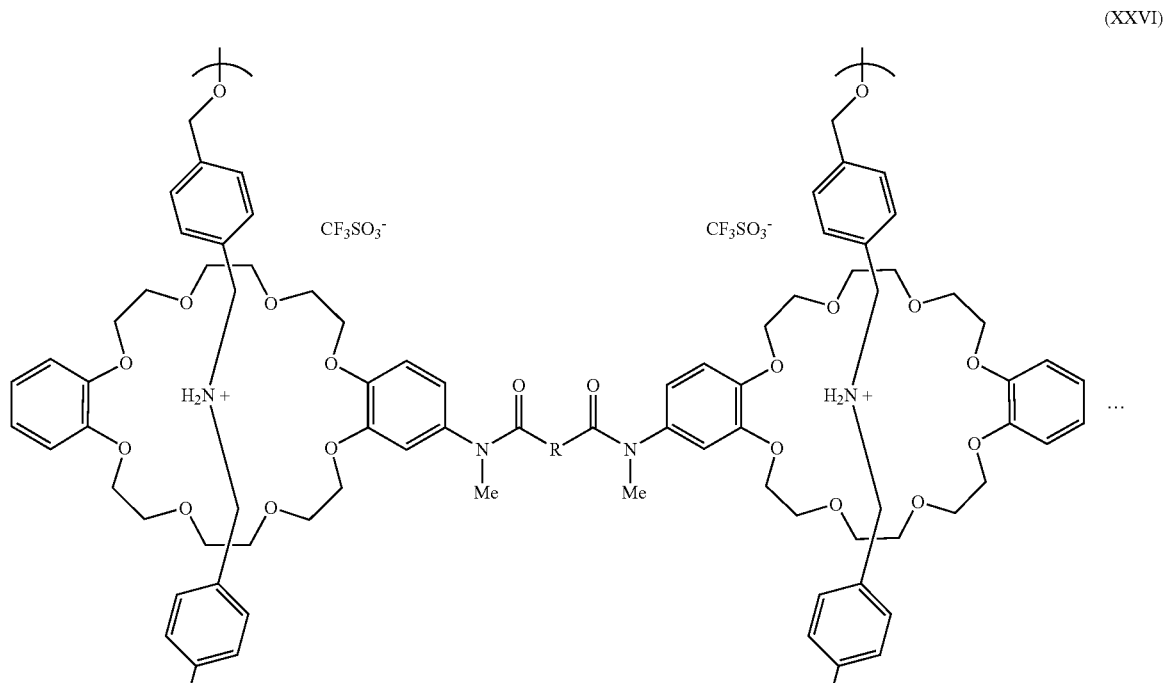
(XXVI)

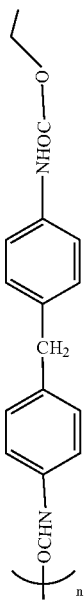

R=p-C$_6$H$_4$

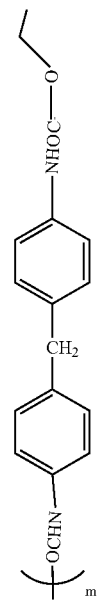

as a colorless solid.

IR(KBr)$\nu_{N-H}$=3400 cm$^{-1}$, $\nu_{C=O}$=1710 cm$^{-1}$

Figure 9:
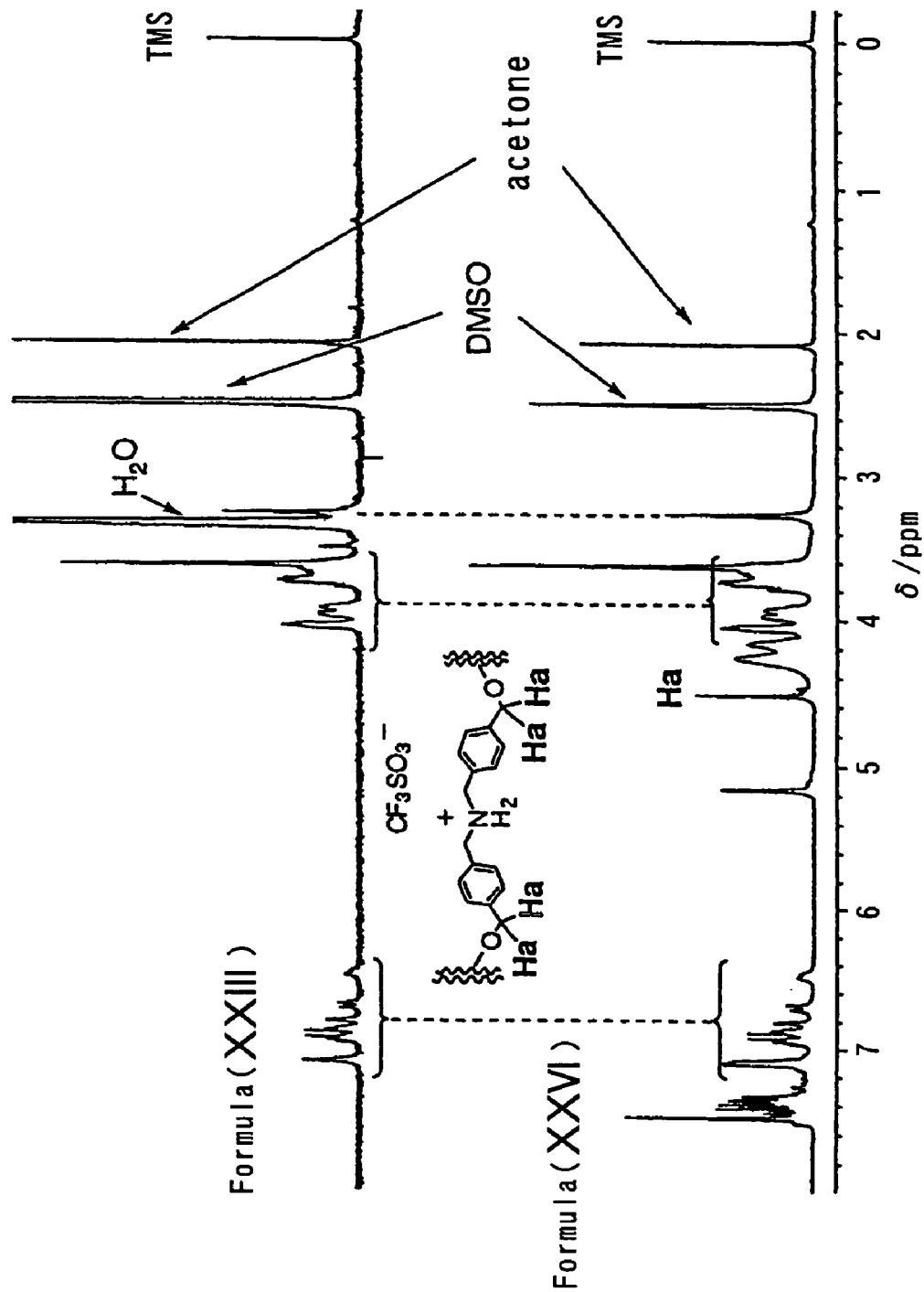
FIG. 9 is a $^1$H-NMR spectrum of the crosslinked body of Example 13 in DMSO.
Figure 10:
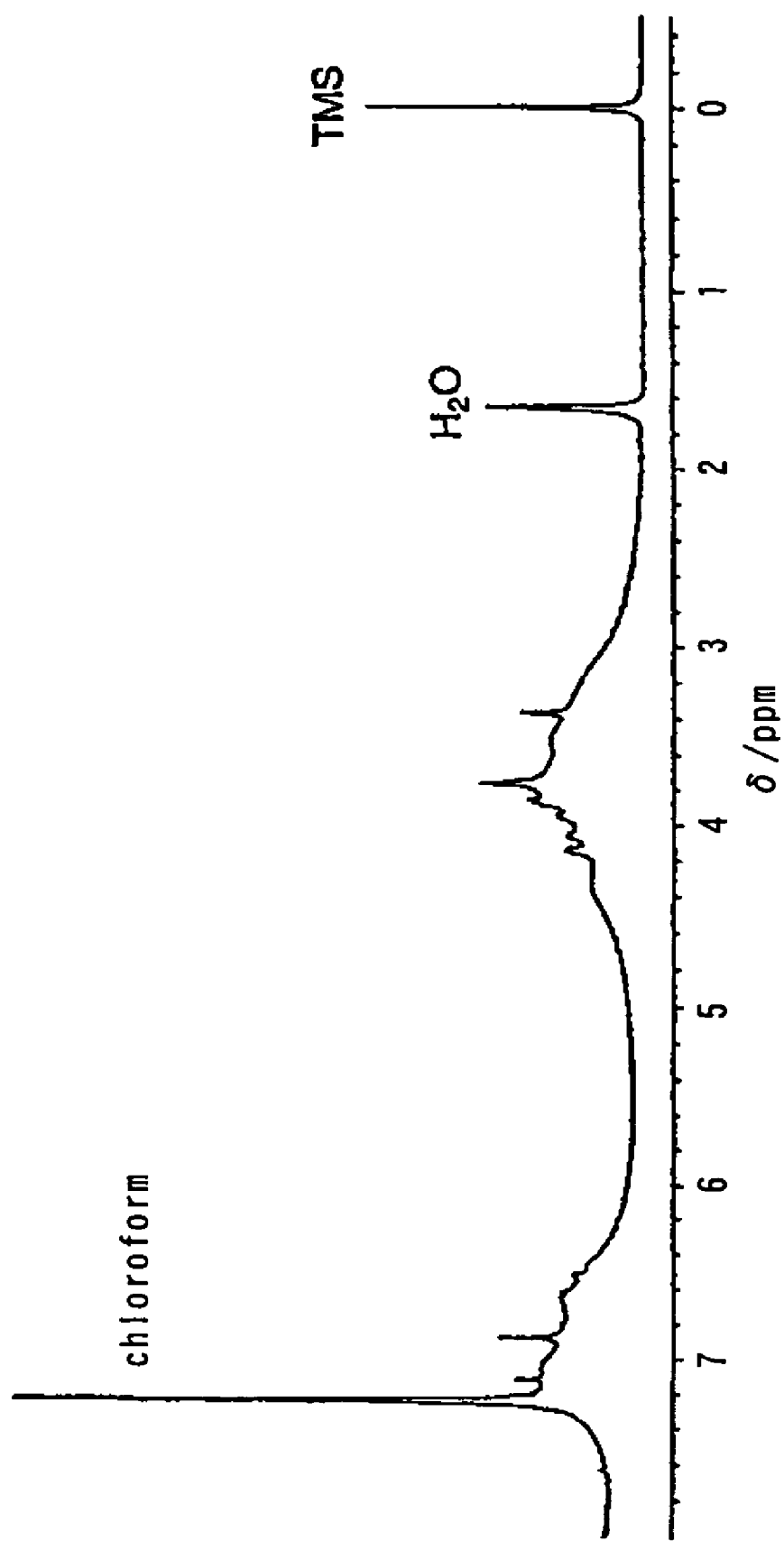
FIG. 10 is a $^1$H-NMR spectrum of the crosslinked body of Example 13 in bichloroform.

The resulting crosslinked body of the formula (XXVI) is brittle and agar-like in the swelling with CHCl$_3$, but becomes gradually elastic during the drying and is a hard solid in the completion of the drying. In FIG. 9 is shown $^1$H-NMR spectrum in DMSO and $^1$H-NMR spectrum in bichloroform is shown in FIG. 10. The NMR spectrum in DMSO is coincident with the NMR spectrum of the compound of the formula (XXIII) in the position of peak, and the peak is shifted when the compound of the formula (XXIII) and the ammonium slat form a complex, from which it is clear that the molecule of the formula (XXIII) in DMSO does not form a complex with the ammonium salt. On the other hand, a broad peak as a whole is confirmed in the NMR spectrum in bichloroform, from which it is confirmed to form a high polymer.

RECYCLING EXAMPLE 1

The polycrown ether of the formula (V) and the bifunctional ammonium salt of the formula (IX) corresponding to 40 mol % of crown unit of the polycrown ether are dissolved in a mixed solution of chloroform/acetonitrile (mixing ratio: 4/1) and added with a thiol represented by the following formula (XXVII):

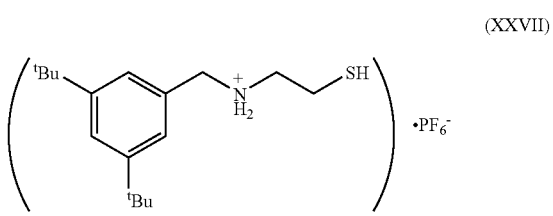

(XXVII)

corresponding to 30 mol % of the ammonium salt of the formula (IX) and left to stand at room temperature. As a result, the crosslinking reaction is proceeded to form a gel.

Although the resulting gel merely swells even in the heating at 60° C. in DMF for 3 days, it becomes uniform in DMF containing a catalytic amount of the thiol of the formula (XXVII) in 70 minutes, which shows that the crosslinking with the rotaxane structure is broken. The latter solution is re-precipitated with methanol to quantitatively recover the polycrown ether. Also, a mixture of the bifunctional ammonium salt having disulfide bond and the thiol is recovered in a yield of 92% by re-precipitating the methanol solution with water. From these results, it is confirmed that the above crosslinked body can be recycled into the polycrown ether, the bifunctional ammonium salt and the thiol. The reaction process is shown as follows.

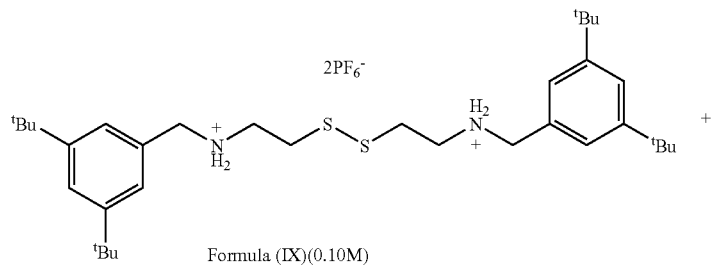

Formula (IX)(0.10M)

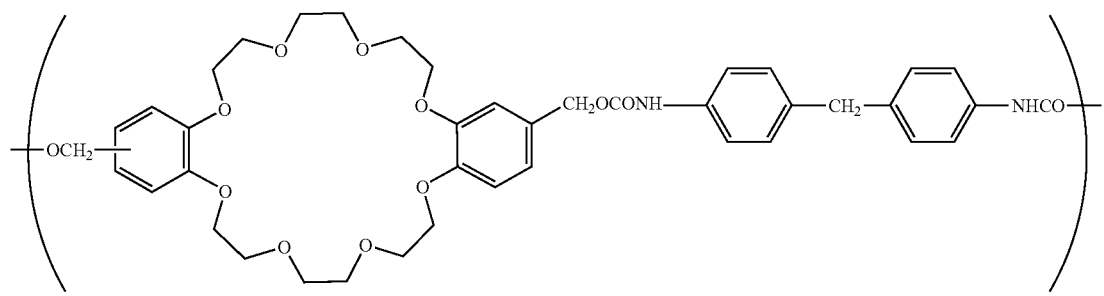

Formula (V) (0.025M based on crown ether ring unit)

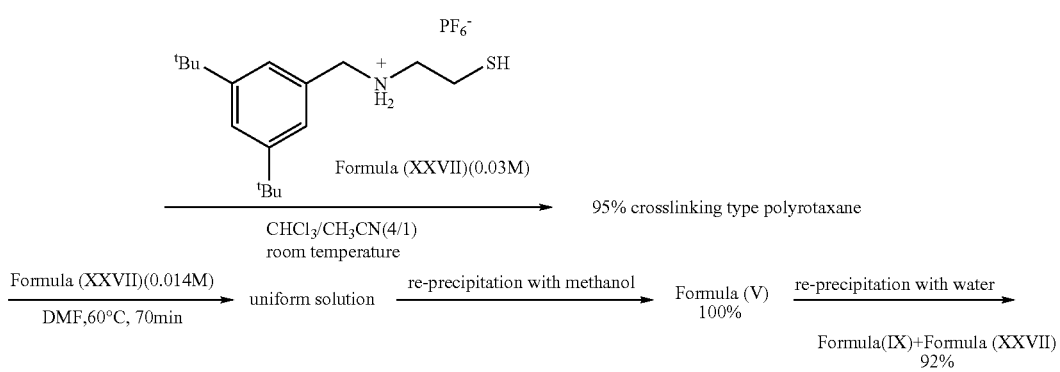

Formula (XXVII)(0.03M)

According to the invention, there can be provided novel crosslinked bodies formed by crosslinking plural polymers through mechanical bonding with rotaxane structure consisting of a ring(s) and a shaft and a method of producing the same. Also, there can be provided a method of recycling the above crosslinked body.

What is claimed is:

1. A method of producing a crosslinked body, which comprises crosslinking a polymer having a plurality of large cyclic structures and a bifunctional ammonium salt having a disulfide bond in the presence of thiols through mechanical bonding with a rotaxane structure.

2. The method according to claim 1, wherein the polymer having a plurality of large cyclic structures is a polycrown ether.

3. The method according to claim 2, wherein the polycrown ether has a crown ether unit represented by the following formula (I):

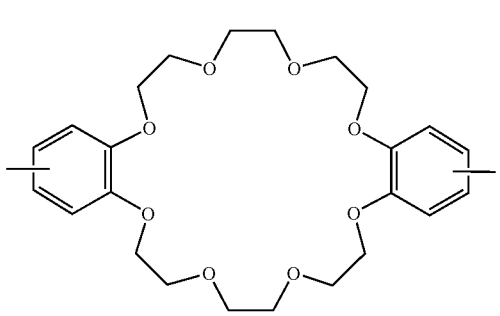

4. The method according to claim 3, wherein the polycrown ether has the crown ether unit of the formula (I) and a urethane bond.

5. The method according to claim 1, wherein the bifunctional ammonium salt having the disulfide bond is represented by the following formula (II):

$$(R^1-N^+H_2-R^2-S-S-R^2-N^+H_2-R^1)\cdot 2X^-  \quad (II)$$

(wherein $R^1$, is a bulky group larger than a hole size of the crown ether unit in the polycrown ether, $R^2$ is a bivalent hydrocarbon residue, which may include a hetero atom, and $X^-$ is a monovalent anion).

6. The method of producing a crosslinked body, which comprises polymerizing [3]rotaxane consisting of one shaft and two polymerizable rings at portions of the rings.

7. The method according to claim 6, wherein a molecule constituting the polymerizable ring is a crown ether.

8. The method according to claim 6, wherein the molecule constituting the shaft is a bifunctional ammonium salt having two urethane bonds.

9. The method according to claim 8, wherein the bifunctional ammonium salt having the two urethane bonds is represented by the following formula (III):

$$(R^1-N^+H_2-R^3-OCONH-R^4-NHCOO-R^3-N^+H_2-R^1)\cdot 2X^- \quad (III)$$

(wherein $R^1$, is a bulky group larger than a hole size of the crown ether unit in the polycrown ether, $R^3$ and $R^4$ are independently a bivalent hydrocarbon residue, which may include a hetero atom, and $X^-$ is a monovalent anion).

10. A method of producing a crosslinked body, which comprises polymerizing a pseudorotaxane formed by inserting a polymerizable chain molecule into each ring of a compound having two large cyclic structures at a portion of the chain molecule.

11. The method according to claim 10, wherein the compound having two large cyclic structures is a biscrown ether.

* * * * *